(12) United States Patent
Lin et al.

(10) Patent No.: US 12,067,730 B2
(45) Date of Patent: Aug. 20, 2024

(54) PANOPTIC SEGMENTATION REFINEMENT NETWORK

(71) Applicant: ADOBE INC., San Jose, CA (US)

(72) Inventors: Zhe Lin, Clyde Hill, WA (US); Simon Su Chen, San Jose, CA (US); Jason Wen-youg Kuen, Santa Clara, CA (US); Bo Sun, Lyndhurst, NJ (US)

(73) Assignee: Adobe Inc., San Jose, CA (US)

( * ) Notice: Subject to any disclaimer, the term of this patent is extended or adjusted under 35 U.S.C. 154(b) by 378 days.

(21) Appl. No.: 17/495,618

(22) Filed: Oct. 6, 2021

(65) Prior Publication Data

US 2023/0104262 A1   Apr. 6, 2023

(51) Int. Cl.
 *G06K 9/00* (2022.01)
 *G06N 3/08* (2023.01)
 *G06T 7/11* (2017.01)
 *G06T 7/194* (2017.01)

(52) U.S. Cl.
 CPC .............. *G06T 7/194* (2017.01); *G06N 3/08* (2013.01); *G06T 7/11* (2017.01)

(58) Field of Classification Search
 CPC ..................................................... G06T 7/174
 See application file for complete search history.

(56) References Cited

U.S. PATENT DOCUMENTS

| | | | |
|---|---|---|---|
| 11,055,566 B1 * | 7/2021 | Pham | G06V 10/82 |
| 2019/0371080 A1 * | 12/2019 | Sminchisescu | G06T 17/20 |
| 2020/0082219 A1 * | 3/2020 | Li | G06V 20/56 |
| 2021/0150226 A1 * | 5/2021 | Rong | G06T 7/11 |
| 2021/0158043 A1 * | 5/2021 | Hou | G06V 10/454 |
| 2021/0248408 A1 * | 8/2021 | Deng | G06T 7/13 |
| 2022/0237799 A1 * | 7/2022 | Price | G06T 3/4046 |

OTHER PUBLICATIONS

"PRN: Panoptic Refinement Network", ICCV Submission, Paper ID 5859, pp. 1-10 (2021).
Badrinarayanan, V., et al., "SegNet: A Deep Convolutional Encoder-Decoder Architecture for Image Segmentation", IEEE Transactions on Pattern Analysis and Machine Intelligence (TPAMI), vol. 39, No. 12, pp. 2481-2495 (Dec. 2017).
Caesar, H., et al., "COCO-Stuff: Thing and Stuff Classes in Context", In IEEE conference on Computer Vision And Pattern Recognition (CVPR), pp. 1209-1218 (2018).

(Continued)

*Primary Examiner* — Hadi Akhavannik
(74) *Attorney, Agent, or Firm* — Shook, Hardy & Bacon L.L.P.

(57) ABSTRACT

Various disclosed embodiments are directed to refining or correcting individual semantic segmentation/instance segmentation masks that have already been produced by baseline models in order to generate a final coherent panoptic segmentation map. Specifically, a refinement model, such as an encoder-decoder-based neural network, generates or predicts various data objects, such as foreground masks, bounding box offset maps, center maps, center offset maps, and coordinate convolution. This, among other functionality described herein, improves the inaccuracies and computing resource consumption of existing technologies.

19 Claims, 10 Drawing Sheets

(56) References Cited

OTHER PUBLICATIONS

Carion, N., et al., "End-to-End Object Detection with Transformers", In European Conference on Computer Vision, arXiv:2005.12872v3, pp. 1-19 (May 28, 2020).
Chen, L.-C., et al., "DeepLab: Semantic Image Segmentation With Deep Convolutional Nets, Atrous Convolution, and Fully Connected CRFs", IEEE Transactions on Pattern Analysis and Machine Intelligence, vol. 40, No. 4, pp. 1-14 (May 12, 2017).
Chen, L.-C., et al., "Encoder-Decoder with Atrous Separable Convolution for Semantic Image Segmentation", In European Conference on Computer Vision (ECCV), pp. 1-18 (Aug. 22, 2018).
Chen, P., et al., "GridMask Data Augmentation", arXiv:2001.04086v2, pp. 1-9 (Jan. 14, 2020).
Chen, Y., et al., "BANet: Bidirectional Aggregation Network with Occlusion Handling for Panoptic Segmentation", In Proceedings of the IEEE/CVF Conference on Computer Vision and Pattern Recognition, pp. 1-11 (Mar. 31, 2020).
Cheng, B., et al., "Panoptic-DeepLab: A Simple, Strong, and Fast Baseline for Bottom-Up Panoptic Segmentation", In Proceedings of the IEEE/CVF Conference on Computer Vision and Pattern Recognition, pp. 12475-12485 (2020).
Cheng, H. K., et al., "CascadePSP: Toward Class-Agnostic and Very High Resolution Segmentation via Global and Local Refinement", In Computer Vision and Pattern Recognition (CVPR), pp. 1-10 (May 6, 2020).
Cordts, M., et al., "The Cityscapes Dataset for Semantic Urban Scene Understanding", In Proceedings of the IEEE conference on computer vision and pattern recognition, pp. 1-11 (2016).
Gao, N., et al., "Learning Category- and Instance-Aware Pixel Embedding for Fast Panoptic Segmentation", arXiv:2009.13342v1, pp. 1-10 (Sep. 28, 2020).
Gao, N., et al., "SSAP: Single-Shot Instance Segmentation With Affinity Pyramid", In International Conference on Computer Vision and Pattern Recognition., pp. 642-651 (2019).
Ghiasi, G., and Fowlkes, C. C., "Laplacian Pyramid Reconstruction and Refinement for Semantic Segmentation", In European Conference on Computer Vision (ECCV), pp. 1-16 (Jul. 30, 2016).
He, K., et al., "Deep Residual Learning for Image Recognition", In Proceedings of the IEEE Conference on Computer Vision and Pattern Recognition, pp. 770-778 (2016).
He, K., et al., "Mask R-CNN", In International Conference on Computer Vision (ICCV), pp. 2961-2969 (2017).
Hou, R., et al., "Real-Time Panoptic Segmentation from Dense Detections", In Proceedings of the IEEE/CVF Conference on Computer Vision and Pattern Recognition, pp. 8523-8532 (2020).
Kingma, D. P., and Ba, J. L., "ADAM: A Method for Stochastic Optimization", arXiv:1412.6980V1, pp. 1-9 (Dec. 22, 2014).
Kirillov, A., et al., "Panoptic Feature Pyramid Networks", In Proceedings of the IEEE Conference on Computer Vision and Pattern Recognition, pp. 6399-6408 (2019).
Kirillov, A., et al., "Panoptic Segmentation", In Proceedings of the IEEE Conference on Computer Vision and Pattern Recognition, pp. 9404-9413 (2019).
Krahenbuhl, P., and Koltun, V., "Efficient Inference in Fully Connected CRFs With Gaussian Edge Potentials", Annual Conference on Advances in Neural Information Processing Systems, pp. 1-9 (2011).
Kuznetsova, A., et al., "The Open Images Dataset V4: Unified image classification, object detection, and visual relationship detection at scale", International Journal of Computer Vision (IJCV), pp. 1-26 (Feb. 21, 2020).
Lazarow, J., et al., "Learning Instance Occlusion for Panoptic Segmentation", In Proceedings of the IEEE/CVF Conference on Computer Vision and Pattern Recognition, pp. 10720-10729 (2020).
Lee, Y., and Park, J., "Centermask: Realtime Anchor-Free Instance Segmentation", In Proceedings of the IEEE/CVF Conference on Computer Vision and Pattern Recognition, pp. 13906-13915 (2020).
Li, Q., et al., "Unifying Training and Inference for Panoptic Segmentation", In Proceedings of the IEEE/CVF Conference on Computer Vision and Pattern Recognition, pp. 13320-13328 (2020).
Li, Q., et al., "Weakly- and Semi-Supervised Panoptic Segmentation", In European Conference on Computer Vision (ECCV), pp. 1-28 (Nov. 20, 2018).
Li, Y., et al., "Attention-guided Unified Network for Panoptic Segmentation", In Proceedings of the IEEE Conference on Computer Vision and Pattern Recognition, pp. 7026-7035 (2019).
Lin, G., et al., "RefineNet: Multi-Path Refinement Networks for Dense Prediction", IEEE Transactions on Pattern Analysis and Machine Intelligence (TPAMI), vol. 42, Issue 5, pp. 1-16 (2019).
Lin, T-Y., et al., "Feature Pyramid Networks for Object Detection", In Proceedings of the IEEE Conference on Computer Vision and Pattern Recognition, pp. 2117-2125 (2017).
Lin, T-Y., et al., "Focal Loss for Dense Object Detection", In Proceedings of the IEEE International Conference on Computer Vision, pp. 2980-2988 (2017).
Lin, T-Y., et al., Microsoft COCO: Common Objects in Context', In European Conference on Computer Vision (ECCV), pp. 740-755 (2014).
Liu, H., et al., "An End-to-End Network for Panoptic Segmentation", In Proceedings of the IEEE Conference on Computer Vision and Pattern Recognition, pp. 6172-6181 (2019).
Liu, R., et al., "An intriguing failing of convolutional neural networks and the CoordConv solution", 32nd Conference on Neural Information Processing Systems (NeurIPS), pp. 1-26 (Dec. 3, 2018).
Loshchilov, I., and Hutter, F., "SGDR: Stochastic Gradient Descent With Warm Restarts", arXiv:1608.03983v5, pp. 1-16 (May 3, 2017).
Neuhold, G., et al., "The Mapillary Vistas Dataset for Semantic Understanding of Street Scenes", In Proceedings of the IEEE International Conference on Computer Vision, pp. 4990-4999 (2017).
Porzi, L., et al., "Seamless Scene Segmentation", In IEEE Conference on Computer Vision and Pattern Recognition., pp. 8277-8286 (2019).
Sofiiuk, K., et al., "AdaptIS: Adaptive Instance Selection Network", In International Conference on Computer Vision, pp. 7355-7363 (2019).
Sudre, C. H., et al., "Generalised Dice overlap as a deep learning loss function for highly unbalanced segmentations", In Deep learning in medical image analysis and multimodal learning for clinical decision support, pp. 1-8 (Jul. 14, 2017).
Tighe, J., et al., "Scene Parsing with Object Instances and Occlusion Ordering", In Proceedings of the IEEE Conference on Computer Vision and Pattern Recognition (CVPR), pp. 1-8 (2014).
Tu, Z., et al., "Image Parsing: Unifying Segmentation, Detection, and Recognition", International Journal of computer vision, vol. 63, Issue 2, pp. 113-140 (2005).
Wang, H., et al., "Pixel Consensus Voting for Panoptic Segmentation", In Proceedings of the IEEE/CVF Conference on Computer Vision and Pattern Recognition, pp. 1-10 (Apr. 4, 2020).
Wang, H., et al., "Axial-DeepLab: Stand-Alone Axial-Attention for Panoptic Segmentation", In European Conference on Computer Vision, pp. 1-26 (Aug. 6, 2020).
Weber, M., et al., "Single-Shot Panoptic Segmentation", IEEE/RSJ International Conference on Intelligent Robots and Systems (IROS), pp. 8476-8483 (Oct. 25-29, 2020).
Wu, Y., et al., "Auto-Panoptic: Cooperative Multi-Component Architecture Search For Panoptic Segmentation", Advances in Neural Information Processing Systems, pp. 1-12 (Oct. 30, 2020).
Wu, Y., et al., "Bidirectional Graph Reasoning Network for Panoptic Segmentation", In Proceedings of the IEEE/CVF Conference on Computer Vision and Pattern Recognition, pp. 1-10 (Apr. 14, 2020).
Xiong, Y., et al., "UPSNET: A Unified Panoptic Segmentation Network", In Proceedings of the IEEE Conference on Computer Vision and Pattern Recognition, pp. 8818-8826 (2019).
Yang, Y., et al., "SOGNet: Scene Overlap Graph Network for Panoptic Segmentation", In Association for the Advancement of Artificial Intelligence (AAAI), pp. 1-8 (2020).
Yao, J., et al., "Describing the Scene as a Whole: Joint Object Detection, Scene Classification and Semantic Segmentation", In Proceedings/CVPR, IEEE Computer Society Conference on Computer Vision and Pattern Recognition, pp. 1-9 (Jun. 2012).

(56) References Cited

OTHER PUBLICATIONS

Zhang, C., et al., "CANet: Class-Agnostic Segmentation Networks with Iterative Refinement and Attentive Few-Shot Learning", In Conference on Computer Vision and Pattern Recognition (CVPR), pp. 5217-5226 (2019).

Zhang, S., et al., "Bridging the Gap Between Anchor-based and Anchor-free Detection via Adaptive Training Sample Selection", In Proceedings of the IEEE/CVF Conference on Computer Vision and Pattern Recognition, pp. 9759-9768 (2020).

\* cited by examiner

PANOPTIC SEGMENTATION REFINEMENT NETWORK

BACKGROUND

Various computer vision technologies detect the identity and precise location of real-world objects represented in images or videos. For example, some technologies perform object detection, semantic segmentation, and/or instance segmentation functionality. Semantic segmentation refers to the task of assigning and indicating (e.g., via a unique pixel-wise mask color or ID) each pixel to a particular class of a real-world object or background represented in an image. For example, semantic segmentation functionality may define a first set of pixels as representing a "bird" and a second set of pixels as also representing a "bird," where both birds are represented by the same mask pixel value. Instance segmentation assigns and defines, with a unique identifier, each pixel to the instance of the real-world object it belongs to. For example, using the illustration above, the first set of pixels representing the first bird may be assigned an instance ID of 1 and a first color mask pixel value. Likewise, the second set of pixels representing the second detected bird may be assigned an instance ID of 2 and/or different mask color pixel value.

The combination of semantic segmentation and instance segmentation is what is referred to as panoptic segmentation. Specifically, in panoptic segmentation, all pixels of an image are uniquely assigned to one of the background classes (referred to as "stuff") or one of the object instances (referred to as "things"). For things, panoptic segmentation functionality thus classifies each pixel in an image as belonging to a particular class and identifies what instance of the class the pixel belongs to. For stuff, panoptic segmentation performs identical functionality as semantic segmentation.

Existing panoptic segmentation and related technologies make inconsistent or inaccurate predictions with respect to detecting instances and/or real-world object classes. Despite advances in these existing technologies, machine learning systems and other solutions suffer from a number of disadvantages. For example, particular existing technologies incorrectly define an instance when it is not an instance, fail to define an instance where an instance should be defined, inaccurately define the boundaries that define an instance, or fail to coherently define the boundaries between stuff and things. Additionally, these technologies unnecessarily consume computing resources (e.g., memory, CPU), among other things.

SUMMARY

One or more embodiments described herein provide benefits and solve one or more of the foregoing or other problems in existing technology with methods, systems, and non-transitory computer readable media for refining or correcting panoptic segmentation masks (or individual semantic segmentation/instance segmentation masks) that have already been produced by baseline models in order to generate a final panoptic segmentation map. For instance, some embodiments further refine a low-resolution mask that has been predicted by existing panoptic segmentation technologies (e.g., Panoptic FPN). This refinement can be performed via new machine learning model functionality and architecture (e.g., an encoder-decoder-based neural network). Such a new model improves existing panoptic segmentation technologies by generating or predicting various data objects, such as foreground masks, bounding box offset maps, center maps, center offset maps, and using coordinate convolution, as described in more detail below. This allows various embodiments to accurately produce a panoptic segmentation map. This, among other functionality described herein, also improves the inaccuracies, and computing resource consumption of existing technologies.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein:

FIG. 9 a schematic diagram illustrating an example computing environment, in which some embodiments of the present disclosure are employed in.

DETAILED DESCRIPTION

Overview

Figure 1:
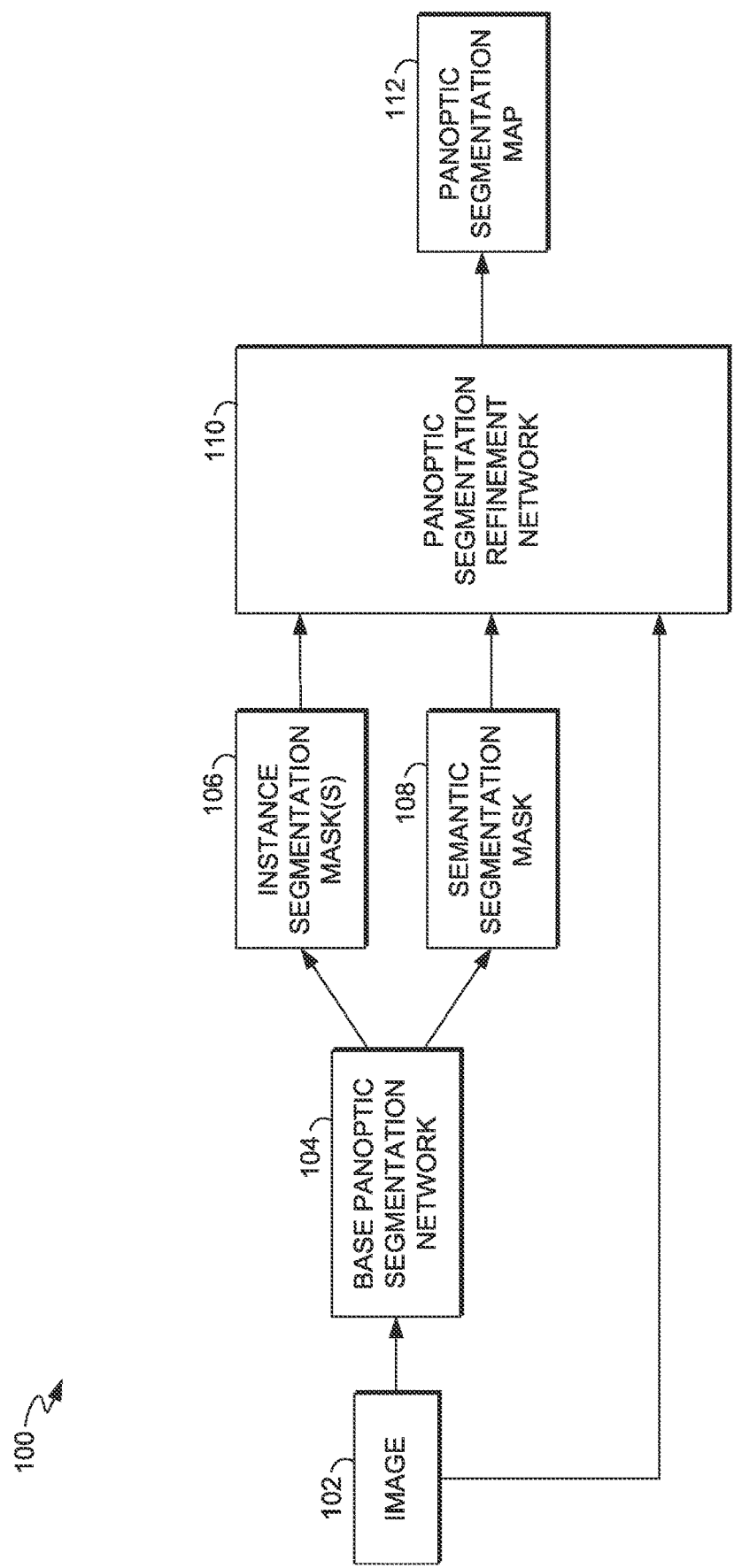
FIG. 1 is a block diagram of an example high-level computing system architecture for generating a panoptic segmentation map, according to some embodiments.

Panoptic segmentation is an emerging task in computer vision that combines semantic segmentation and instance segmentation. Estimating or predicting stuff and things is a challenging technical problem to detect real world objects in images.

Some existing panoptic segmentation technologies, such as Panoptic FPN, are built upon Mask R-CNN, which is a region-based instance segmentation method that extracts region of interest (RoI) features to generate low-resolution (e.g., 14×14, 28×28) instance masks. Many other panoptic segmentation methods are based on the same low-resolution RoI-based mask prediction. Such low-resolution masks do not effectively capture the fine-grained details of object boundaries and thus fail to achieve high quality semantic segmentation results. Furthermore, it is common for existing models to train independent instance segmentation and semantic segmentation prediction branches to predict object instances (also referred to as "instances") and stuff masks separately. This typically calls for a heuristic-driven post-processing step to resolve the conflicts among instance and stuff masks in the panoptic segmentation map, which produces unsatisfactory or inaccurate results. For example, these technologies do not optimize a panoptic loss function, but rather optimize intermediate outputs that are fused heuristically. As a result, these technologies may incorrectly define an instance when it is not an instance, fail to define an instance where an instance should be defined, fail to coherently define boundaries between instances and stuff, or inaccurately define the boundaries that define an instance.

In the task of semantic segmentation, segmentation refinement may be used to refine the segment boundaries with limited success. Despite the similarities between panoptic segmentation and semantic segmentation, refinement solutions developed for semantic segmentation cannot be directly applied to panoptic segmentation due to the lack of instance handling and awareness in semantic segmentation. Moreover, refining instance masks individually does not guarantee that the refined instance masks and stuff masks are coherent along the segment boundaries.

Although some segmentation refinement technologies are able to refine one object/instance at a time, it is very computationally expensive to apply such methods iteratively to every single segment of an object in an image to improve the segmentation quality. Specifically, with respect to computational overhead, it is CPU/GPU intensive (e.g., in terms of CPU utilization in fetch, decode, execute) to iterate over every set of pixels or segment included in an instance, which reduces latency and throughput, and potentially reduces network bandwidth when those computations are shared among other functionality in a web application. Such unnecessary iterations also cause problems with respect to memory consumption in order to store the iterative results for a prediction. Further, input/output (I/O) is also increased in many cases because each or most iterations can require a read/write to disk. This is not only time consuming, but error prone and can eventually wear on I/O components due to the required mechanical movements of a read/write head.

Various embodiments of the present disclosure provide various technical solutions to these problems indicated above, as well as other problems. Particular embodiments are directed to refining or correcting panoptic segmentation masks (or individual semantic segmentation/instance segmentation masks) that have already been produced by baseline models (e.g., machine learning models) in order to generate a final panoptic segmentation map. In operation, some embodiments derive via at least a first model (e.g., a CNN-based panoptic segmentation model), a first mask and a second mask, where the first mask indicates a set of objects in the input image belonging to a first object class, and the second mask defines each instance of the set of objects. For example, the first mask may be or include a semantic segmentation mask that defines, via a first pixel value, a set of pixels representing a group of animals of the same class (e.g., dogs) and also defines, via a second pixel value, a background (e.g., the sky or ground) class in an image. In another example, the second mask may be or include an instance segmentation mask that defines, via a third pixel value, a set of pixels representing a first dog in the image and further defines, via a fourth pixel value, another set of pixels representing a second dog in the same image.

Some embodiments additionally generate, via at least a second model (e.g., an encoder-decoder-based neural network), a third mask, where the third mask indicates which pixels of an input image correspond to a foreground of the input image. The foreground excludes pixels corresponding to a background of the input image. These foreground masks are typically designed to distinguish between all of the things and stuff in an image. In some embodiments, such a mask representing the foreground is class-agnostic in that each instance, regardless of class, is represented by the same indication or identifier. For example, an image of an outdoor landscape may represent trees, bushes, and each animal (the "things") as the same pixel value and removes or represents the sky and ground (the "stuff") as a different pixel value. Foreground masks improve the defining of the boundaries between stuff and things.

Some embodiments alternatively or additionally generate a center offset map and/or a center map. In some embodiments, the center map indicates a probability of each pixel being a center pixel of one or more instances of the set of objects. For example, such probability can be indicated by a heat map, where the closer a pixel is to an instance's center, the warmer the color. In some embodiments, the center offset map indicates a location of the first pixel relative to the center pixel. Such center and center offset maps help models define the boundaries and distinguish instances with more accuracy since each pixel is quantitatively associated to its corresponding instance's center point.

Some embodiments alternatively or additionally generate a bounding box offset map over one or more instances of a set of objects. The bounding box offset map indicates a distance that one or more pixels, of the one or more instances, is from each side of a bounding box that encompasses the one or more instances. This helps enhance the pixel grouping process to assign a pixel to a particular instance.

At inference or prediction time, some embodiments use or merge, via a machine learning model, one or more of: the foreground mask, the center map, the center offset map, the bounding box offset map, the semantic segmentation mask, and/or the instance segmentation map to generate a panoptic segmentation map, as described in more detail below.

Various embodiments of the present disclosure improve the accuracy of existing technologies by further refining the low-resolution mask predicted by existing panoptic segmentation technologies (e.g., Panoptic FPN) via new machine learning model (e.g., an encoder-decoder-based neural network) functionality. In some embodiments, such model is designed to work with a base panoptic segmentation model (without any restriction on the choice of a base panoptic segmentation network). Some embodiments improve these technologies by predicting high-resolution masks (e.g., masks at the same resolution as the input image) for things and stuff jointly or in a single shot/branch. In other words, these embodiments refine instance masks and stuff masks at the same time. As described above, it is common for existing models to train independent instance segmentation and semantic segmentation prediction branches to predict instance and stuff masks separately. This produces unsatisfactory or inaccurate results by not optimizing a panoptic segmentation loss function, but rather optimize intermediate outputs (e.g., a semantic segmentation mask and instance segmentation mask) that are fused heuristically. However, particular embodiments optimize a panoptic loss function during training. As a result, particular embodiments accurately suppress or remove an incorrectly defined instance in an instance segmentation mask. Likewise, some embodiments correctly define an instance not originally indicated in an instance map. Further by predicting high-resolution masks for things and stuff jointly or in a single shot, this ensures that the output instance mask and the stuff mask boundaries are coherent.

Some embodiments improve the accuracy of existing technologies by generating a foreground mask (e.g., that is class-agnostic). In some embodiments, such foreground mask is generated at the same high-resolution as the input image, unlike existing technologies. Foreground masks provide constraints that improve the defining of boundaries between things and stuff. Foreground masks, especially at high-resolution, effectively capture the fine-grained details of object boundaries and thus achieve high quality semantic segmentation results or segmentation between stuff and things.

Some embodiments additionally or alternatively improve the accuracy of instance prediction or defining instances in an image by generating a center offset map and/or a center map. This is because the center map indicates a probability of each pixel being a center pixel of one or more instances of the set of objects. And the center offset map indicates a location of each pixel relative to the center pixel. In other words, each pixel is quantitatively associated to its corresponding instance's center point, thereby allowing the precise boundary to be formulated for each instance in an image.

Some embodiments alternatively or additionally improve the accuracy of existing technologies by generating a bounding box offset map over one or more instances of a set of objects. The bounding box offset map indicates a distance that one or more pixels, of the one or more instances, is from each side of a bounding box that encompasses the one or more instances. This helps enhance the pixel grouping process to assign a pixel to a particular instance in order to correctly define instances. In sum, the foreground mask, the center map, center offset map, and/or the bounding box offset map help embodiments suppress or remove an incorrectly defined instance, define an instance where an instance should be defined, and/or accurately define the boundaries that define an instance.

Various embodiments of the present disclosure improve computing resource consumption relative to existing technologies. For example, various embodiments improve segmentation refinement by performing instance handling without iterating over each separate instance. In some embodiments, this is because of the class-agnostic foreground mask that does not distinguish between instances. In other words, there is a single iteration over all of the instances of an image in order to mask or otherwise process them all with the same pixel value. Specifically, with respect to computational overhead, it is not as CPU/GPU intensive because embodiments are not iterating over every set of pixels or segment indicated by each instance. Therefore, embodiments reduce the latency and throughput, and reduce network bandwidth relative to existing technologies. Further, because of the lack of iteration, there is not as much memory consumption and I/O is reduced. This is because there are less I/O read/write operations going to disk. This is not only less time consuming than existing technologies, but less error prone and less likely to wear on I/O components, such as a read/write head.

The generation of foreground masks alone also improve computing resource consumption, such as memory. In some embodiments, foreground masks are used to replace the role of a standard semantic segmentation map as the background filter. Semantic segmentation maps have a relatively low resolution due to the memory intractability of predicting the dense pixel-wise segmentation map with several semantic categories. Accordingly, particular embodiments generate a foreground mask to replace such semantic segmentation mask. In particular embodiments, such foreground mask is a single channel (i.e., indicating which pixels represent the foreground and which pixels do not), which means heavy memory consumption is less of an issue. Thus particular embodiments are able to predict the foreground mask at the same high resolution as the input image and reduce memory consumption.

Referring now to FIG. 1, a block diagram is provided showing high-level functionality for generating a panoptic segmentation map 112, according to some embodiments. At a first time, the image 102 (e.g., a RGB digital photograph) is fed to a base panoptic segmentation network 104. A "base" panoptic segmentation network is any machine learning model, such as a deep neural network, that is configured to produce an instance segmentation mask 106 and semantic segmentation mask 108 (or combination thereof). For example, the base panoptic segmentation network 104 can be or include a Mask R-CNN, a shared Feature Pyramid Network Backbone, models that present a unified framework for "things" and "stuff" segmentation with object-level and pixel-level attentions, the Adaptive Instance Selection (AdaptIS) network, and/or a Bidirectional Graph Reasoning Network.

The Panoptic Segmentation Refinement Network (referred to herein as "PRN") 110 is another machine learning model (or set of machine learning models) that produces a panoptic segmentation map 112 by further refining or correcting one or more of: the instance segmentation mask 106 or the semantic segmentation mask 108 (or combination of the two, such as an original panoptic segmentation map). The PRN 110 takes as input, the instance segmentation mask 106, the semantic segmentation mask 108 (or combination thereof), and the image 102 to produce the panoptic segmentation map 112. As described herein, the panoptic segmentation map 112 indicates a refinement or correction of instances indicated in the instance segmentation mask 106 and/or the semantic segmentation mask 108. In other words, the PRN 110 represents a novel architecture for refining panoptic segmentation that is able to alleviate the common shortcomings of state-of-the-art panoptic segmentation algorithms described above. PRN 110 specifically reduces errors caused by inconsistency between instance and stuff segmentation, occlusion among instances of the same type, and low-resolution instances, while being able to recover missing instances, and fix incorrectly merged and split instances, as described above. In some embodiments, this is accomplished via the introduction of one or more elements, including a foreground mask, center mask, center offset mask, coordinate convolution, and prediction of the offsets of an instance bounding box at each pixel. As described in more detail herein, particular embodiments experimentally validate PRN 110 on challenging panoptic segmentation datasets (e.g., Common Objects in Context ("COCO") and Cityscapes), demonstrating that the PRN 110 can significantly improve the results of panoptic segmentation networks (e.g., the base panoptic segmentation network 104).

In some embodiments, PRN 110 includes some of the functionality of the architecture of Panoptic-DeepLab, which performs single-shot panoptic segmentation coherently using semantic segmentation and center-based instance prediction. Panoptic-DeepLab predicts high-resolution masks for instances and stuff jointly, but it suffers from poor classification (Recognition Quality/RQ) performance due to the severe class imbalance occurring in the pixel-wise semantic segmentation training samples. The training tends to be dominated by stuff categories, which have larger pixel counts in the images compared to the instance categories. RoI-based panoptic segmentation methods use a separate detection head, which is less affected by class imbalance, to detect and classify the instances. This observation motivates particular embodiments to change the role of Panoptic-DeepLab from a conventional approach that does panoptic segmentation from scratch, to a panoptic refinement module that takes the well-categorized but coarsely-segmented outputs from a trained RoI-based panoptic segmentation network and focuses on refining its low-resolution masks to achieve high-quality segmentation.

However, directly applying the architecture of Panoptic-DeepLab as a refinement module has several limitations. Firstly, to prevent excessive memory consumption, the semantic segmentation branch's multi-class output has a smaller resolution thus it produces foreground masks with limited segmentation fidelity. Secondly, detecting instances with instance center prediction and center offset regression is not sufficiently robust and may incorrectly split an instance into multiple instances.

Accordingly, in some embodiments, the PRN 110 addresses the critical limitations of Panoptic-DeepLab and redesigns it as a model that is a general, effective, and an efficient refinement method that can be trained to improve any base panoptic segmentation results. It is the first approach to tackle the segmentation quality issues suffered by existing RoI-based panoptic segmentation methods, while concurrently preserving the strong classification performance of such methods. PRN 110 can bring significant improvements over different base panoptic segmentation models, while producing consistent instance and stuff mask predictions.

The PRN 110 improves boundary consistency across instances and stuff, reduces artifacts due to low-resolution instance boundaries, and corrects erroneously merged or split instance masks. The PRN 110 includes various novel components, such as foreground mask estimation, coordinate convolution, and per-pixel instance bounding box prediction that enable corrections, as described in more detail below.

Figure 2:
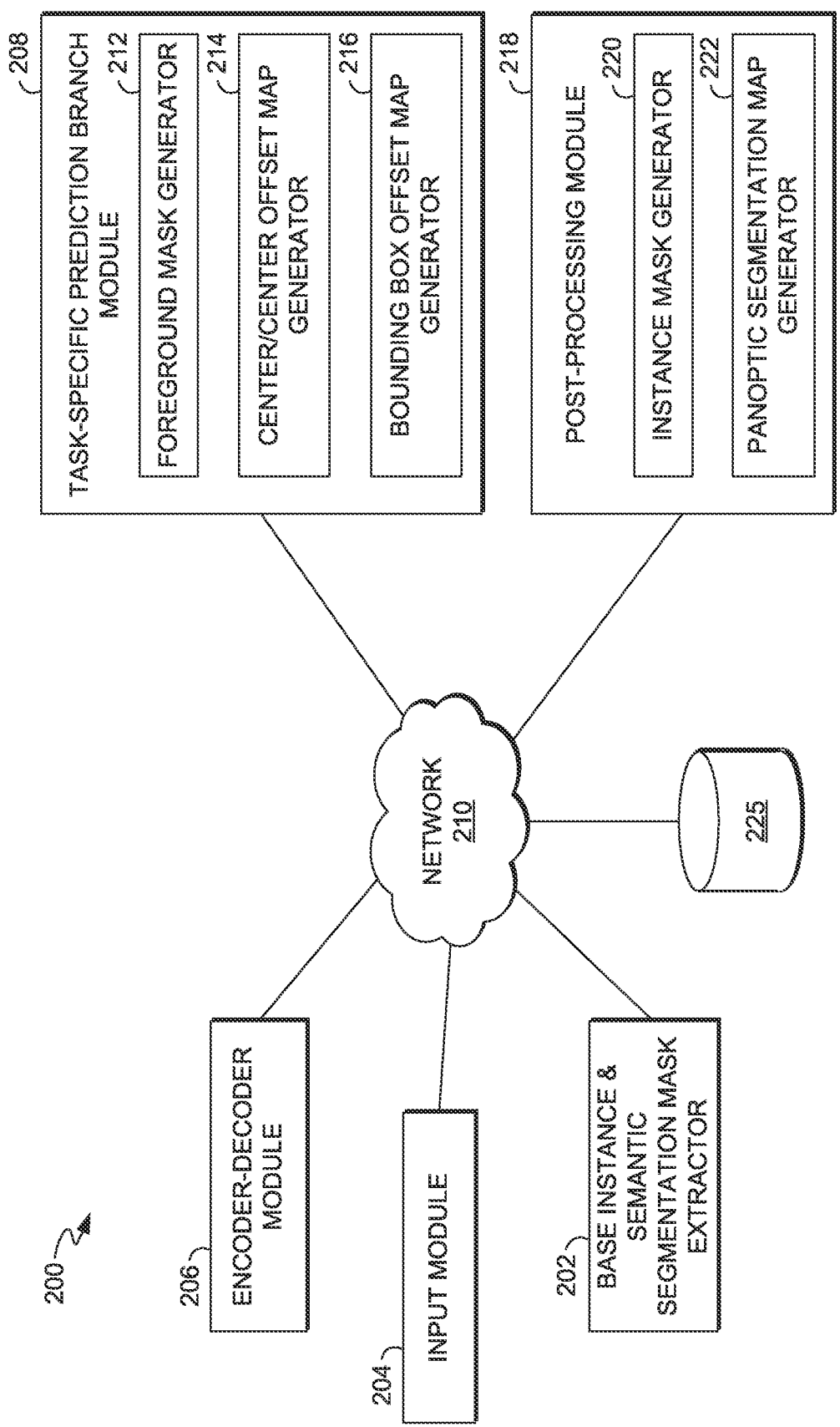
FIG. 2 is a block diagram of an example computing system architecture suitable for implementing some embodiments of the present disclosure.

Referring now to FIG. 2, a block diagram is provided showing high-level aspects of an example computing system architecture suitable for implementing an embodiment of the disclosure and designated generally as the system 200. The system 200 represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For example, some or each of the components of the system may be located within a single computing device (e.g., the computing device 1000 of FIG. 10). Alternatively, some or each of the components may be distributed among various computing devices, such as in a distributed cloud computing environment. In some embodiments, the system 200 and each of the components are located within the server and/or user device of FIG. 9, as described in more detail herein.

The system 200 includes network(s) 210, which is described in connection to FIG. 9, and which communicatively couples components of system 100, including the base instance & semantic segmentation mask extractor 202, the input module 204, the encoder-decoder module 206, the task-specific prediction branch module 208, and the post-processing module 218. In some embodiments, the input module 204, the encoder-decoder module 206, the task-specific prediction branch module 208, and the post-processing module 218 is included in the panoptic segmentation refinement network 110 of FIG. 1. The components of the system 200 may be embodied as a set of compiled computer instructions or functions, program modules, computer software services, logic gates, or an arrangement of processes carried out on one or more computer systems.

The system 200, described at a high level, generally operates to generate a panoptic segmentation map. These maps can be used to generate visual renderings of objects depicted in an input image. An "image" as described herein is a visual representation of one or more portions of the real world. For example, an image can be a digital photograph, a digital image among a sequence of video segments, a graphic image file (e.g., JPEG, PNG, etc.), a picture (or sub-element of a picture), and/or a bitmap among other things.

The base instance & segmentation extractor 202 is generally responsible for deriving an instance segmentation mask and a semantic segmentation mask. In some embodiments, the base instance & segmentation extractor 202 represents the base panoptic segmentation network 104 of FIG. 1. In some embodiments, the base instance & segmentation extractor 202 does not perform the actual functionality to generate instance segmentation and semantic segmentation masks, but rather receives these masks (e.g., from a deep panoptic segmentation base network).

In some embodiments, a "mask" refers to a binary mask (e.g., a 2-D array) that has a data point representing the same pixel width and height of an input image. In some embodiments, each pixel or data point in a mask is labelled as a 0 or non-zero value (e.g., a 1) (true or false), which indicates whether or not the pixel belongs to the predicted instance or class. For example, a foreground mask may be a binary mask, which indicates whether or not the pixel belongs to the foreground or background (0 or 1). However, in some embodiments, a mask is not binary, but rather can be represented by multiple non-binary values. For example, a semantic segmentation mask or instance mask may not be binary, as there may be multiple classes or instances, each of which may be represented by a unique value. In some embodiments, each of these masks (or the output or results of these masks) is an image similar to an input image, except one or more objects in the image are defined by pixel values that are different relative to the corresponding input image. For example, an input image may be an outdoor picture of various farm animals, such as multiple pigs and multiple horses. The pixels representing these objects may represent their real-world color. For example, the set of pixels representing the pigs may be pink in color and the pixels representing the horses may be brown in color. A mask may change the values of these objects relative to the objects in the input image. For example, in a semantic segmentation mask, each pixel of each pig may be a blue color (instead of a pink), where the blue pixels represents detected objects of the same pig class. Each pixel of each horse may be a green color (instead of brown), where the green pixels represent detected objects of the same horse class. In an instance segmentation mask, each pixel of each instance of a particular class may be different colors. For example, a first pig may be a blue color, and a second pig may be a yellow color.

The input module 204 is generally responsible for down sampling and concatenating features from an input image, the instance segmentation mask, and the semantic segmentation mask (or combination thereof). Down sampling reduces the spatial dimensions in an input image based on particular mathematic operations, such as average or max-pooling. Input images are typically highly dimensional data. Accordingly, it is often desirable to reduce the dimensionality to minimize the possibility of overfitting. Down sampling acts as a noise suppressant and helps capture essential structural features represented in an input image without capturing every single fine detail.

In some embodiments, the input (e.g., to the PRN 110) comprises three parts: an RGB image at H×W resolution, instance segmentation masks at H×W resolution, and semantic segmentation masks at H/4×W/4 resolution, all from the base panoptic segmentation network (e.g., the base panoptic segmentation network 104 of FIG. 1). Different from conventional panoptic segmentation networks, PRN 110 handles various kinds of inputs including the panoptic segmentation predictions from a base panoptic segmentation network. In some embodiments, for the instance segmentation masks from a base panoptic segmentation network, the input module 204 first converts them into the instance map format adopted by Panoptic-Deeplab. For different input formats, particular embodiments design various input branches to transform the inputs into the same ¼ resolution before concatenating/aggregating them. Functionality performed by the input module 204 is described in more detail below.

The encoder-decoder module 206 is generally responsible for joint refinement or correction (e.g., via a single decoder) of instance segmentation and semantic segmentation. In response to processing the input via the input module 204, particular embodiments feed X' to an encoder-decoder network that generates multi-scale deep features for use by the task-specific prediction branch module 208 (e.g., PRN 110's output branches). Compared to existing technologies that learn separate decoders for instance prediction and semantic segmentation output branches, particular embodiments use an efficient shared decoder for both branches. In some embodiments, the encoder-decoder module 206 is an encoder-decoder neural network. In some embodiments, the encoder-decoder module 206 is included in or represents deep encoder-decoder networks, such as a U-NET. For example, in some embodiments, the encoder-decoder module 206 performs a convolution operation followed by a non-linear activation function ("ReLU") to contract the kernels into a particular quantity of channels and pixels, followed by a max pooling function. Encoder-decoder functionality is described in more detail below.

The task-specific prediction branch module 208 is generally responsible for refining (or generating): a foreground mask (via the foreground mask generator 212), a center/center offset map (via the center/center offset map generator 214), and a bounding box offset map (via the bounding box offset map generator 216). More specifically, the task-specific prediction branch module 208 splits each instance segmentation mask (derived by the based instance & segmentation mask extractor 202) into a center map and center offset map and refines these maps. In some embodiments, the resulting foreground, center/center offset, and bounding box offset maps are indicative of the predictions made by a machine learning model. For example, an encoder-decoder neural network may predict which pixels correspond to a foreground in an image and responsively generate a foreground mask; which pixel corresponds to a center pixel of an instance and the magnitude, in distance, a pixel is from the center pixel and responsively generate a center/center offset map; and the distance a pixel is from the four sides of a bounding box and responsively generate a bounding box offset map.

In some embodiments, the foreground masks and the bounding box offset maps are only generated directly by the task-specific prediction branch module 208 (and not generated by a base model). To make instance segmentation mask prediction more robust, at each foreground/instance pixel (each pixel included in the foreground), in particular embodiments the bounding box offset map generator 216 predicts bounding box offset values, which are then used to enhance the post processing step to group instance pixels via the post-processing module 218. Some embodiments improve a model's capability to regress instance offsets by making the model more coordinate aware (e.g., via Coord-Conv). This functionality, as well as the generation/refinement of each of these mask produced by the task-specific prediction branch module 208 are described in more detail below.

The post-processing module 218 is generally responsible for merging one or more masks and/or maps produced by the task-specific prediction branch module 208 to jointly refine the instance and segmentation (generated by base models) in a single shot. The instance mask generator 220 is generally responsible for merging the predicted offset and center map (generated by the center/center offset map generator 214) into instance masks with the help of the predicted foreground mask and bounding box at each pixel. The panoptic segmentation map generator 222 is generally responsible for merging the maps already merged by the instance mask generator 220 and the semantic segmentation mask (produced by a base model) to produce a final panoptic segmentation map, which is described in more detail below.

The storage 225 (e.g., a database, RAM, cache, persistent storage, etc.) can include different training data (e.g., labeled images) that have been used to train deep networks or other machine learning models, as described in more detail below. Additionally or alternatively, storage 225 can include the masks, maps or objects generated by the components of the system 200.

In some embodiments, the components of the system 200 represent a novel architecture for refining panoptic segmentation that is able to alleviate the common shortcomings of state-of-the-art panoptic segmentation algorithms. The system 200 reduces errors caused by inconsistency between instance and stuff segmentation, occlusion among instances of the same type, and low-resolution instances, while being able to recover missing instances, and fix incorrectly merged and split instances. This is accomplished via the introduction of novel elements including a foreground mask, coordinate convolution, and prediction of the offsets of an instance bounding box at each pixel.

Figure 3:
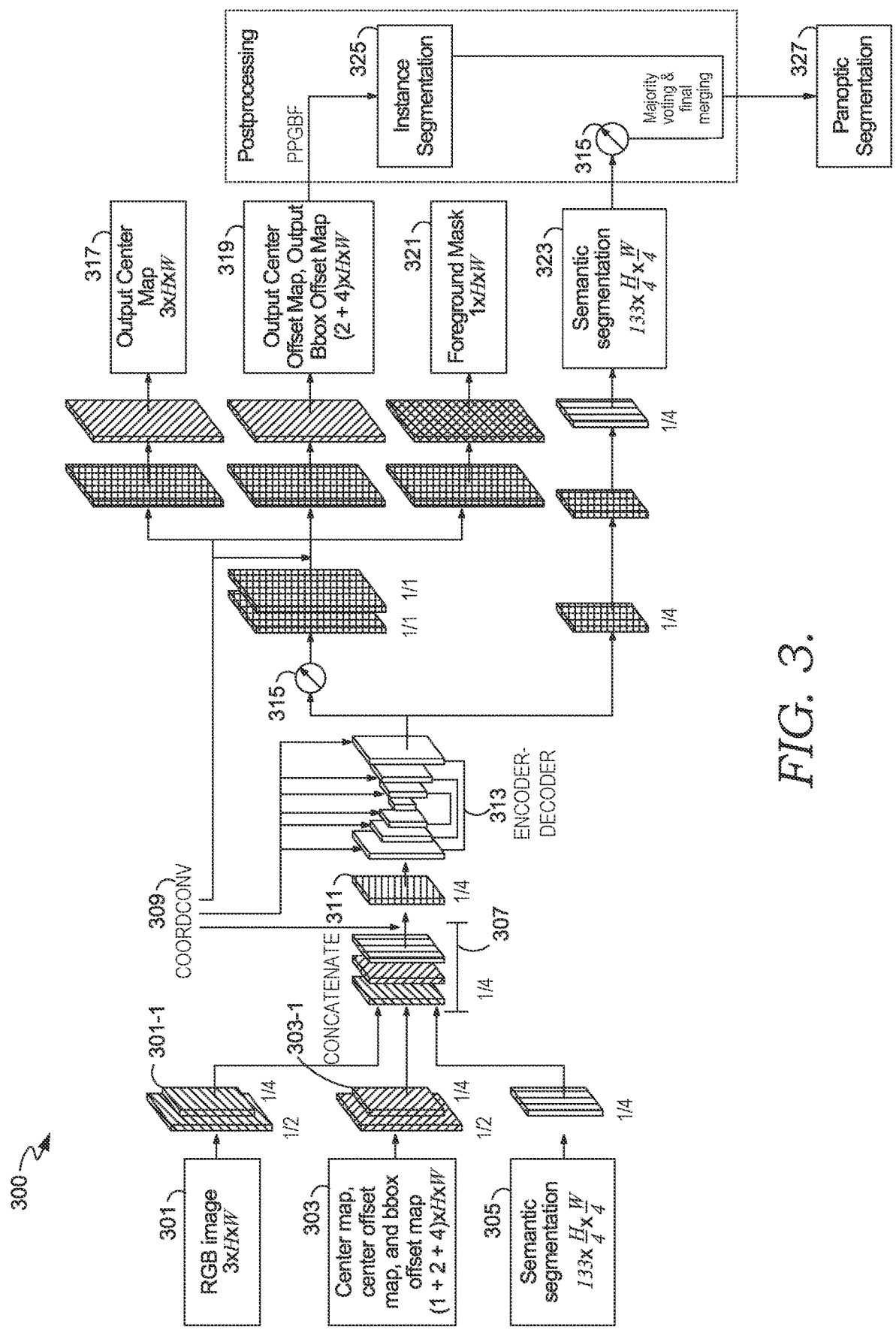
FIG. 3 is a schematic diagram of an example architecture of a panoptic segmentation refinement network (PRN), according to some embodiments.

FIG. 3 is a schematic diagram of an example architecture of a panoptic segmentation refinement network (PRN) 300, according to some embodiments. In some embodiments, the PRN 300 represents the PRN 110 of FIG. 1.

The input to PRN 300 comprises three parts: the RGB image 301 at H×W resolution, instance segmentation maps 303 at H×W resolution, and semantic segmentation map 305 from the base panoptic segmentation network (e.g., the base panoptic segmentation network 104 of FIG. 1) at $$\frac{H}{4} \times \frac{W}{4}$$

resolution, all. The input image 301 and the instance maps 303 are down-sampled to 301-1 and 303-1 respectively, after which all of the inputs are concatenated 307 to arrive at a concatenated feature map 311 (e.g., a single feature vector representing features from all of the inputs).

Different from conventional panoptic segmentation networks, PRN 300 can handle various kinds of inputs including the panoptic segmentation predictions from a base panoptic segmentation network. For the instance masks from a base panoptic segmentation network, particular embodiments first convert them into the instance map format adopted by Panoptic-Deeplab. For different input formats, particular embodiments design various input branches to transform the inputs into the same ¼ resolution before concatenating/aggregating them.

Motivated by the intuition that the pixels of the same instance should also be associated with the same bounding box, particular embodiments design a novel 4D bounding box offset map (part of the instance maps 303), which complements the center and center offset maps to further constraint how PRN 300 detects instances. As shown in FIG. 3, the four channels ($d_1$, $d_2$, $d_3$, $d_4$) correspond to the distance/offset from the pixel to the top, bottom, left and right of the instance's bounding box. The bounding box offset maps make up the last four channels of the input instance maps.

FIG. 3 illustrates that the input RGB image 301 is fed to a RGB-specific input branch that includes two 5×5 convolutional layers with a stride of 2 to obtain RGB-specific features $$V_{rgb} \in \mathbb{R}^{N_{en} \times \frac{H}{4} \times \frac{W}{4}},$$

where $N_{en}$ is the encoder network's input channel number. The input instance segmentation mask 305 is fed to a separate instance-specific input branch that includes 5×5 convolutional layers with a stride of 2 to produce instance-specific features $$V_{ins} \in \mathbb{R}^{N_{en} \times \frac{H}{4} \times \frac{W}{4}}.$$

The input semantic segmentation maps 305 has $N_{cl}$ channels, where $N_{en}$ is the number of semantic (e.g., things and stuff) classes. The classification probabilities of the classes across all pixel locations are represented by the input semantic segmentation maps 305. It is fed to a semantic-specific input branch consisting of a 5×5 convolutional layer to generate the semantic-specific features $$V_{seg} \in \mathbb{R}^{N_{en} \times \frac{H}{4} \times \frac{W}{4}}.$$

Particular embodiments concatenate the features from all the input branches along with a 2D normalized coordinate map denoted as $$C \in \mathbb{R}^{2 \times \frac{H}{4} \times \frac{W}{4}}$$

to obtain the feature maps $$307 \, X \in \mathbb{R}^{(3N_{en}+2) \times \frac{H}{4} \times \frac{W}{4}}$$

as, X=Concat($V_{rgb}$, $V_{ins}$, $V_{seg}$, C). X is then fed to two 5×5 convolutional layers to obtain the feature maps $$X' \in \mathbb{R}^{N_{en}+2 \times \frac{H}{4} \times \frac{W}{4}}.$$

In order to predict the center and bounding box offset values effectively in the instance prediction output branch, PRN 300 may be strongly aware of pixel-wise coordinates. Some embodiments are the first to leverage CoordConv 309, by adding 2D normalized coordinate map 311 to X to improve the regression of center and bounding box offset values. Besides here, CoordConv 309 is applied to the subsequent parts of PRN 300 including its encoder-decoder network 313 and instance prediction branch (i.e., 325), to further boost PRN's 300 coordinate awareness.

In traditional convolution, each filter is applied to the input to generate the output. But the model does not know where each filter is. Embodiments can assist convolution by letting filters know where they are. In some embodiments, this is done by adding two channels to the input: one with i coordinates and one with j coordinates. We call the resulting layer CoordConv. Put another way, CoordConv learns a mapping between coordinates in (x, y) Cartesian space and coordinates in one-hot pixel space. "One-hot pixel space" represents an image where only one pixel is activated (e.g., having a value of 1 in the one-hot representation). Consider a simple task of Supervised Rendering in which we give an (i, j) location (Cartesian Space) as input to a network and ask it to produce a 64×64 image painted/highlighted with one pixel (one-hot pixel space) centered at that location. Convolutions do not adequately perform this task. In convolution, as each filter is applied to the input to generate the output, it does not know where each filter is. However, in CoordConv, convolution is assisted by letting filters know where they are. This is done by adding two channels to the input—one with the i coordinates and one with j coordinates. This layer is an extension to the standard convolutional layer where convolution is conditioned on coordinates. Coord-Conv thus allows convolutional filters to see coordinates.

Specifically, the CoordConv layer 309 is a simple extension to the standard convolutional layer. It has the same functional signature as a convolutional layer, but accomplishes the mapping by first concatenating extra channels to the incoming representation. These channels contain hard-coded coordinates, the most basic version of which is one channel for the i coordinate and one for the j coordinate that allows filters to know where they are in Cartesian space by adding extra, hard-coded input channels that contain coordinates of the data seen by the convolutional filter.

For a 2D image with I rows and J columns, two extra feature channels are added with the following entries: for the first channels, the 0th row just contains 0s, the next row just contains all 1s, while for the second channels, the 0th column just contains 0s, the next contains all 1s (i.e. the coordinates of the pixels are being supplied). This is what the additional channels look like at the input layer. For other layers in the network, the number of rows and columns will correspond to the height and width of the feature map at that particular layer instead. So CoordConv 309 can be applied at any layer, not just the input layer (which is really the only one working in the raw pixel space). Another channel that can be introduced is the distance of that particular pixel from the center of the image, a polar coordinate representation.

The CoordConv layer 309 keeps the properties of few parameters and efficient computation from convolutions, but allows the network to learn to keep or to discard translation invariance as is needed for the task being learned. This is useful for coordinate transform based tasks where regular convolutions can fail.

After processing the input, particular embodiments feed X' to an encoder-decoder network 313 that generates multi-scale deep features for use in PRN 300's output branches. Compared to Panoptic-Deeplab that learns separate decoders for instance prediction and semantic segmentation output branches, an encoder-decoder network 313 is designed with an efficient shared decoder for both branches. In some embodiments, there are modifications made to Residual Network, and decoder layers are added to build the encoder-decoder network 313. Firstly, particular embodiments remove the first convolutional layer and plug in an input module (e.g., the input module 204 of FIG. 2). Secondly, particular embodiments apply CoordConv to the each bottleneck block of the encoder and to each layer of the decoder. Thirdly, particular embodiments take the encoder's features at ¼, ⅛, 1/16 and 1/32 scales, and feed them to the decoder layers through skip connections. Other than the above, and in some embodiments, the encoder-decoder 313 follows the architectural details of standard encoder-decoder networks.

For example, the encoder-decoder network 313 can perform a convolution operation (or CoordConv) followed by a non-linear activation function ("ReLU") to contract the kernels into a particular quantity of channels and pixels (e.g., 5×5 (and/or 3×3)). In particular embodiments, the resolutions represent the sizes of the kernel of the convolution and not the spatial (image) resolution of the output. In some embodiments, the output of the convolution has the same spatial resolution as the input (thanks to a padding operation). The convolution operation (or convolutional layer) generates one or more feature maps, which each represent a feature (e.g., a set of pixels) of the inputs. There may be various features of an input and thus there may be various linearly stacked feature maps for a given image. A feature map is also an array of values that represent sets of pixels and weights where a value is weighted higher when it matches a corresponding pixel or set of pixels in the corresponding section of the input image, instance maps, and/or semantic maps. The convolution layer includes an algorithm that uses each feature map to scan or analyze each portion of the input. Accordingly, each pixel of each feature map is compared and matched up against a corresponding pixel in each section of the input and weighted according to similarity. In some embodiments, the convolutional layer performs linear functions or operations to arrive at the feature map by multiplying each image pixel value with its own feature value and then performing a summation function of each product. In various embodiments, in response to the convolution operations and ReLU being computed, a batch normalization (BN) is performed, which re-centers and re-scales the resulting set of pixels.

In various embodiments, a max pooling function is then performed. Max pooling (i.e., the max pooling layer) reduces the resolution or compresses each feature map by picking a window size (i.e., a quantity of dimensional pixels that will be analyzed in the feature map) and selecting the maximum value of all of the values in this window of the feature map as the only output for the modified feature map.

For example, the max pooling layer can compress 512×512 pixels to 256×256 via a max pooling operation.

In various embodiments, additional convolutional, non-linear activation functions, and max pooling operations (also known as "down sampling" or "contraction" or "encoder" operations) can continue. For example, a 3×3 convolutional operation, ReLU, and BN operation, can be followed by another 3×3 convolutional operation, ReLU, and BN operation, followed by another max pooling operation at 2×2. Then up sampling (also known as "expansion" or "decoder" operations) can be performed. For example, n×n can be up sampled to 2n×2n (numeral 312), after which there is a 3×3 convolutional operation, ReLU, operation, and BN operation (which is repeated). Then additional up sampling can occur, followed by 1×1 convolutional operation, which is a 512×512 pixel representation. "Skip connections" are a concatenation of features from the encoder The output of the encoder-decoder 313 is denoted by $$Y \in \mathbb{R}^{C_{de} \times \frac{1}{4} \times \frac{1}{4}},$$

where $C_{de}$ is number of decoder's output channels. The encoder-decoder 313's features Y are used in PRN 300 semantic segmentation branch and multiple instance prediction branches: instance center points, center offsets, bounding box offsets, and class-agnostic foreground mask. Due to a smaller output size of the instance prediction branch $$(\frac{1}{4})$$

of the encoder-decoder 313 compared to the image size, a bilinear upsampling layer 315 is first applied to upsample the incoming features Y, before applying multiple parallel branches of consecutive two 5×5 and 1×1 convolutional layers to predict the multiple instance outputs at the image resolution. Another upsampling layer 315 is applied to upsample features from the semantic segmentation 323 for producing the semantic segmentation map 327.

In some embodiments, the semantic segmentation branch 323 uses the same resolution $$(\frac{1}{4})$$

as the decoder's output and no upsampling is required. Following Panoptic-Deeplab, cross entropy loss is used to train the semantic segmentation branch.

In some embodiments of PRN 300, the ground-truth instances are represented by their centers of mass via 2D Gaussians as in Panoptic-Deeplab. In some embodiments, mean Squared Error (MSE) loss is used to minimize the errors between predictions and the ground-truth values in the 2D Gaussian-encoded center heat map. During inference, non-maximum suppression (NMS) is applied to obtain the confident instance centers 317 and 319.

In some embodiments, center offsets are predicted to associate each pixel with its corresponding instance's center point, such that pixels belonging to the same instance can be grouped together. However, such an approach is far from robust and often incorrectly splits an instance into multiple smaller instances, due to the use of just a simple centernessbased criterion. To robustify the pixel grouping process in PRN 300, particular embodiments propose to additionally predict a bounding box offset map (part of 319), in which the offset values are the distances from the current pixel to the four sides of the box bounding the instance it belongs to. For simplicity, particular embodiments incorporate bounding box offset prediction to PRN 300 by predicting four additional output channels on top of the 2-channel center offset in the offset prediction branch as follows, $(c_x, c_y, d_1, d_2, d_3, d_4)$, where $(c_x, c_y)$ are the center offset predictions and $(d_1, d_2, d_3, d_4)$ are the bounding box offset predictions. In some embodiments, the offset branch is trained with L1 loss.

In some embodiments, the predicted input instance maps have seven channels. Following Panoptic-Deeplab, the first three channels are represented by a 1D center map and a 2D center offset map derived from the output of a base panoptic segmentation network. In some embodiments, the center map is a heat map in which each pixel indicates the probability of it being an instance center. In some embodiments, in the center offset map, each pixel contains the 2D offset values that map its current location to the center location of the instance it belongs to, along the horizontal and vertical axes.

In Panoptic-Deeplab, the semantic segmentation map acts as a background filter during inference. However, the segmentation map has a relatively small resolution due to the computational (memory) intractability of predicting the dense pixel-wise segmentation map with several semantic categories. To this end, particular embodiments generate a foreground mask 321 via a foreground mask prediction branch for PRN 300 that outputs a class-agnostic (objectness) foreground mask to replace the role of semantic segmentation map as the background filter. Given K number of binary ground-truth instance masks $B=\{B_i | i=\{1, 2, \ldots, K\}\}$, particular embodiments compute the target 1D foreground mask using bitwise OR as, $B_1 \vee B_2 \vee \ldots \vee B_K$. The "bitwise OR" is a binary operation that takes two bit patterns of equal length and performs the logical inclusive OR operation on each pair of corresponding bits. The result in each position is 0 if both bits are 0, otherwise the result is 1. Since the foreground mask is single-channel in some embodiments, heavy memory consumption becomes less of an issue and thus the network is able to predict the foreground mask at the same high resolution as the input image. This provides higher segmentation fidelity especially to the instance categories, as the boundaries of instances which are in contact with the stuff masks are primarily decided by the foreground mask. Cross entropy loss is used to train the foreground mask branch.

Continuing with FIG. 3, during inference, there are two post-processing steps for PRN's 300 raw predictions before the final panoptic segmentation map can be obtained: (1) merge the center and offset maps to form the instance mask 325, (2) merge the semantic segmentation mask 323 and instance segmentation masks 325 to form the final panoptic segmentation map 327. In some embodiments, this post-processing algorithm guided by both the predicted foreground mask 321 and bounding box offset map 319. First, particular embodiments perform a keypoint-based non-maximum suppression (NMS) on the instance center heat map 317 to obtain the center point prediction. A threshold $\theta$ is used to filter out predictions with low confidence, and only the pixels with the top-k highest confidence scores are kept. Particular embodiments set $\theta=0.2$, k=200. Secondly, particular embodiments assign the pixels on the center offset map 319 to the nearest centers which should have an Intersection Over Union (IoU) greater than 0.5 with the instance's bounding box determined by its center point from the center heat map 317. Particular embodiments remove the pixels that cannot be assigned to any center points' bounding boxes with IoU greater than 0.5. Lastly, particular embodiments use the predicted foreground mask 321 to filter out the bounding boxes of background pixels.

Given the predicted semantic segmentation 323 and class-agnostic instance segmentation results 325, particular embodiments adopt a majority vote method to obtain the category label of each instance mask. In particular, the semantic label of a predicted instance mask is inferred by the majority vote of its corresponding pixels' predicted semantic labels in the segmentation map 323. Particular embodiments then merge the semantic segmentation 323 and instance segmentation results 325 to obtain the final panoptic segmentation map 327.

Figure 4:
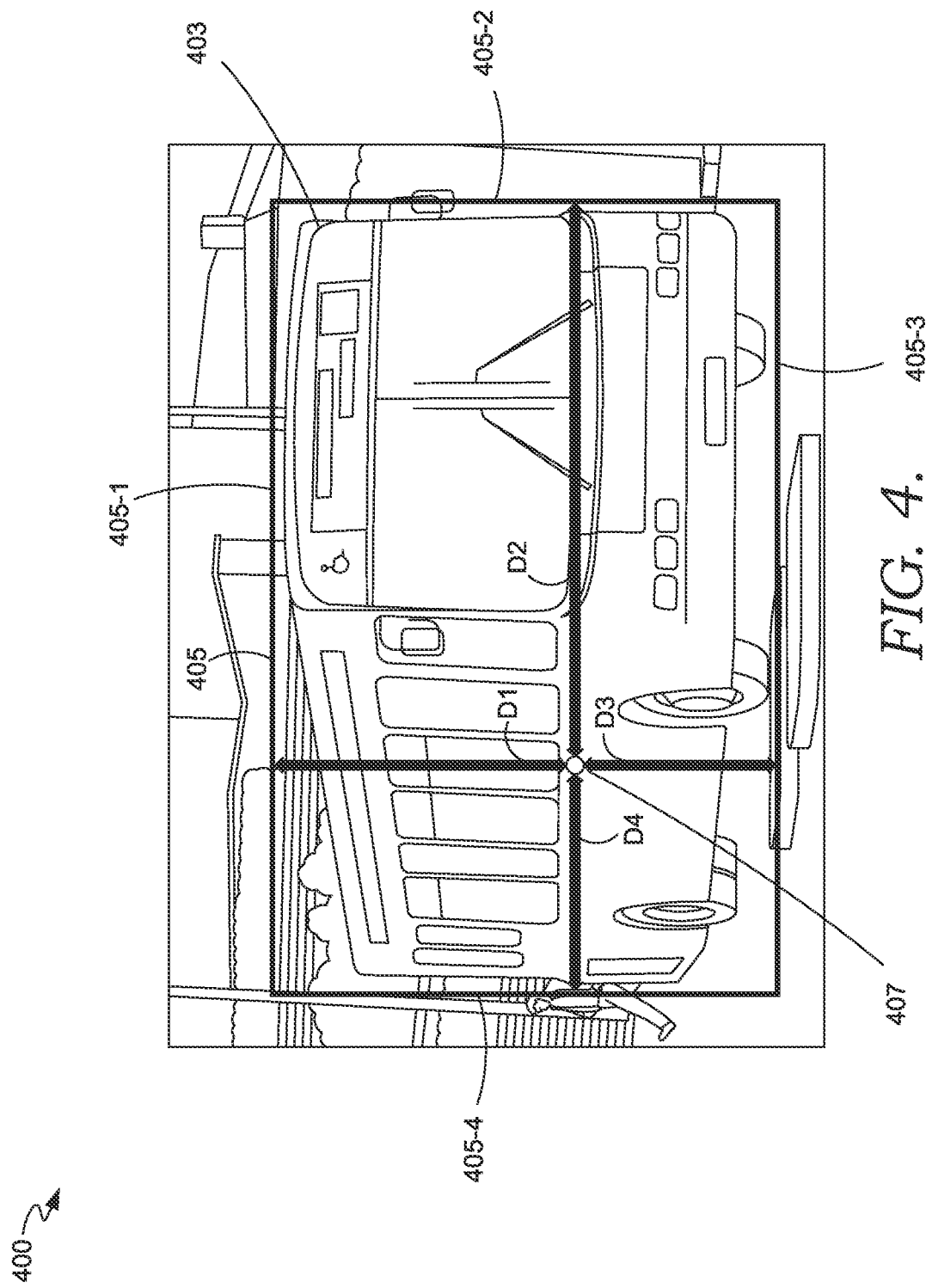
FIG. 4 is a schematic diagram of a bounding box offset map, according to some embodiments.

FIG. 4 is a schematic diagram of a bounding box offset map 400, according to some embodiments. In some embodiments, the map 400 represents the predicting bounding box offset map included in 319 of FIG. 3. In some embodiments, the map 400 is produced by the bounding box offset map generator 216 of FIG. 2. As described herein, particular embodiments generate a 4D bounding box offset map 400, which complements the center and center offset maps to further constraint how PRN detects instances. As shown in FIG. 4, the four channels $(d_1, d_2, d_3, d_4)$ correspond to the distance/offset from the pixel 409 to the top 405-1, bottom 405-3, left 405-4, and right 405-2 of the instance's bounding box 405. In some embodiments, the bounding box offset maps make up the last four channels of the input instance maps.

To robustify the pixel grouping process in PRN, particular embodiments additionally predict a bounding box offset map 400, in which the offset values are the distances from the current pixel 409 to the four sides of the box bounding the instance (i.e., the bus 403) it belongs to, as illustrated in FIG. 4. For simplicity, particular embodiments incorporate bounding box offset prediction to PRN by predicting four additional output channels on top of the 2-channel center offset in the offset prediction branch as follows, $(c_x, c_y, d_1, d_2, d_3, d_4)$, where $(c_x, c_y)$ are the center offset predictions and $(d_1, d_2, d_3, d_4)$ are the bounding box offset predictions. The offset branch is trained with L1 loss.

Figure 5:
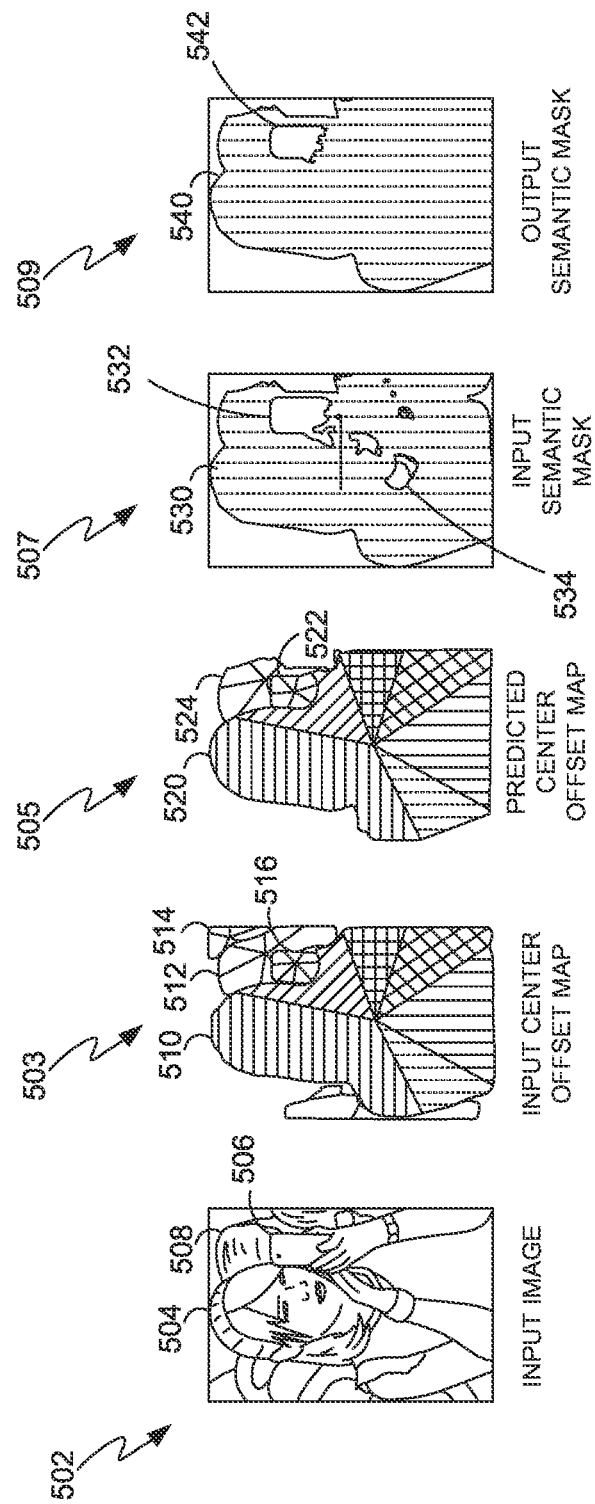
FIG. 5 is a schematic diagram illustrating an input image, center offset maps, and semantic segmentation masks, according to some embodiments.

FIG. 5 is a schematic diagram illustrating an input image, center offset maps, and semantic segmentation masks, according to some embodiments. At a first time an input image 502 is derived. In some embodiments, the input image 502 represents the image 102 of FIG. 1. The input image 502 includes a first person object 504, a phone object 506, as well as a second person object 508 (e.g., representing the back of a head of another person).

The input center offset map 503 illustrates a center offset map that has been generated by a refinement model (e.g., the panoptic segmentation refinement network 110 of FIG. 1), such as before it is fully trained. As illustrated by the input center offset map 503, there are various defined instances, each instance being a heat map and indicating the instance's center point or center pixel. For example, for the instance 510 (representing the person object 504 of the input image 502), the center is represented by the point 518. Similar functionality is performed via the instances 512, 514 and 516. The predicted center offset map 505 illustrates a center offset map that has been generated by the refinement model (e.g., after training or a loss is deemed acceptable). For example, in some embodiments, the predicted center offset map 505 illustrates a center offset map that has been generated by the panoptic segmentation refinement network 110 or the encoder-decoder network 313 of FIG. 3 to produce the output center map 317. As illustrated in FIG. 5, the predicted center offset map 520 is more accurate relative to the input center offset map 503. For example, the input center offset map 503 has incorrectly split the second person object 508 into two separate instances 514 and 512, whereas the predicted center offset map 505 has correctly split the second person object 508 into a single instance 524 (and has correctly split the phone object 506 into 522 and the first person object 504 into 520).

The input semantic mask 507 represents a semantic segmentation mask derived from a base model (e.g., the base panoptic segmentation network 104). In some embodiments, the input semantic mask 507 represents 305 of FIG. 3. As illustrated by the input semantic mask 507, there is a single mask/pixel value 530 that represents both person objects 504 and 508 of the input image 502. Likewise, there is a different mask 532 (a different pixel value), which represents the phone object 506 of the input image 502. However, there are incorrectly defined masks, such as mask 534, which incorrectly define instances within the instance 530. The output semantic mask 509 represents a semantic segmentation mask generated by another machine learning model. For example, in some embodiments, the output semantic mask 509 is generated by the panoptic segmentation refinement network 110 of FIG. 1 and/or the encode-decoder network 313 to generate 323 of FIG. 3. As illustrated in FIG. 5, the output semantic mask 509 is more accurate relative to the input semantic mask 507. For example, the output semantic mask 540 includes the mask 540 representing the person objects 504 and 508, but not the object 534, which should not be defined as an instance.

Figure 6:
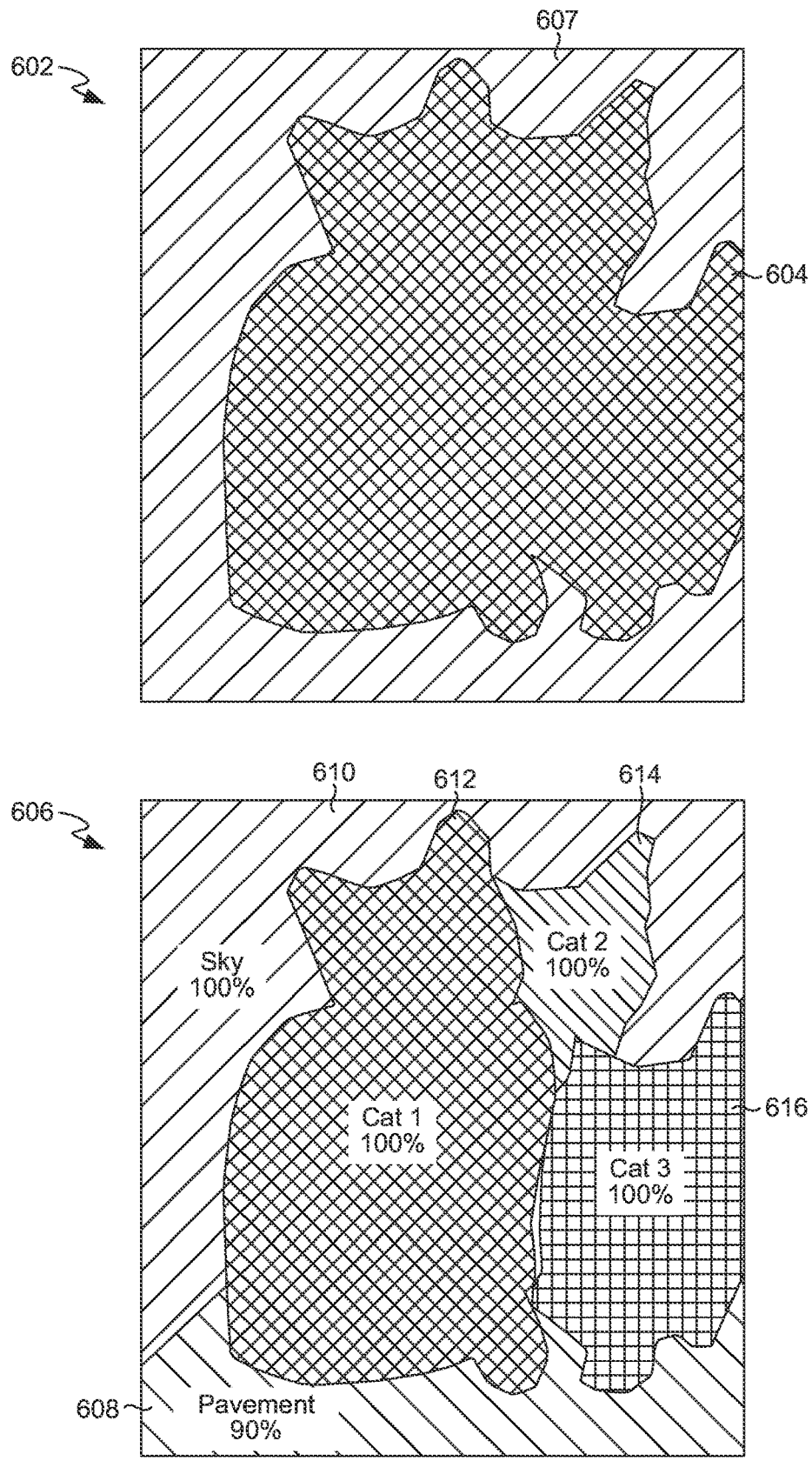
FIG. 6 is a schematic diagram of an example foreground mask and a panoptic segmentation map, according to some embodiments.

FIG. 6 is a schematic diagram of an example foreground mask 602 and a panoptic segmentation map 606, according to some embodiments. The foreground mask 602 represents all of the foreground objects (three cats) as a single mask pixel value 604, and excludes the background 607. In some embodiments, the foreground mask 602 represents the foreground mask 321 of FIG. 3. As described herein, in Panoptic-Deeplab, the semantic segmentation map acts as a background filter during inference. However, the segmentation map has a relatively small resolution due to the computational (memory) intractability of predicting the dense pixel-wise segmentation map with several semantic categories. To this end, various embodiments generate a foreground mask prediction branch for PRN that outputs a class-agnostic (objectness) foreground mask to replace the role of semantic segmentation map as the background filter. Given K number of binary ground-truth instance masks B={$B_i$|i={1, 2, . . . , K}}, the target 1D foreground mask is computed using bitwise OR as, $B_1 \vee B_2 \vee \ldots \vee B_K$. Since the foreground mask is single-channel, heavy memory consumption is less of an issue and thus the network is able to predict the foreground mask at the same high resolution as the input image. This provides higher segmentation fidelity especially to the instance categories, as the boundaries of instances which are in contact with the stuff masks are primarily decided by the foreground mask.

The panoptic segmentation map 606 merges or combines one or more masks/maps, as described herein, such as a center map, center offset map, foreground mask (e.g., foreground mask 602), semantic segmentation mask, and the like. In some embodiments, the panoptic segmentation map 606 represents the panoptic segmentation map 112 of FIG. 1. As illustrated by the panoptic segmentation map 606, the three cat instances 612, 614, and 616 have been defined by different pixel values (e.g., Red, blue, and green) and IDS (e.g., cat 1, cat 2, cat 3). In other words, each pixel that is assigned or included in an instance is represented by the same pixel value for that instance. For example, each pixel that defines the cat 612 can be a red color or tint. Likewise, the sky object 610 has been assigned another pixel value (e.g., purple) and the pavement object 608 has been assigned another pixel value (e.g., yellow). Each object has also been assigned a confidence interval, which is indicative of how confident a model is at predicting the identity and location of the corresponding object. For example, there is a 90% likelihood that the pavement 608 is indeed pavement, and a 100% likelihood that the cat 612 is indeed a cat. These pixel values an indicia (e.g., confidence level and class/instance name) are different than input images since input images con Experimental Results As described herein, various embodiments improve existing technologies in terms of accuracy, among other things. The inventors have conducted experiments with regard to accuracy and visual quality, as described in more detail below. Various embodiments generate a Panoptic Refinement Network (PRN), which takes masks from base panoptic segmentation models and refines them jointly to produce a coherent and consistent result. In some embodiments, the PRN builds on the offset map-based architecture of Panoptic-Deeplab with several novel ideas including auxiliary foreground mask and instance bounding box prediction losses, as well as coordinate convolutions for improved spatial prediction.

Experimental results on COCO and Cityscapes show that PRN can significantly improve base panoptic segmentation results. Various embodiments experimentally validate PRN on challenging panoptic segmentation datasets, such as COCO and Cityscapes, demonstrating that even the results of highly accurate panoptic segmentation networks can be significantly improved. In some embodiments, PRN refines the results of the base panoptic segmentation model it is trained on.

As shown in the paragraph below, Table 1 illustrates quantitative results on the COCO validation set. MS-PanopticFPN achieves comparable results to the top-performing methods. PRN (e.g., PRN 110), trained on its results, improves the PQ of MS-PanopticFPN by 3.8% almost reaching the best published results. PRN is then trained on the panoptic segmentation results of DETR and improve its PQ by 1.7%, advancing the state of the art on the COCO validation set. PRN can refine the panoptic segmentation results of a base panoptic segmentation network trained on the same dataset. As illustrated in Table 1, DETR, Real-time Panopti, and a variant of PanopticFPN are used as base networks. DETR is a state of the art detection method which performs very well in panoptic segmentation. Real-time Panoptic is a single-shot panoptic segmentation network that leverages dense detections and a global self-attention mechanism to achieve real-time performance and near-SOTA accuracy.

TABLE 1

Panoptic segmentation results on the COCO validation set.

| Method | Backbone | PQ | $PQ^{Th}$ | $PQ^{St}$ |
|---|---|---|---|---|
| Panoptic FPN | Res50-FPN | 39.0 | 45.9 | 28.7 |
| UPSNet | Res50-FPN | 42.5 | 48.6 | 33.4 |
| AUNet | Res50-FPN | 39.6 | 49.1 | 25.2 |
| CIAE | Res50-FPN | 40.2 | 45.3 | 32.3 |
| OCFusion | Res50 | 41.3 | 49.4 | 29.0 |
| BANet | Res50-FPN | 41.1 | 49.1 | 29.1 |

TABLE 1-continued

Panoptic segmentation results on the COCO validation set.

| Method | Backbone | PQ | $PQ^{Th}$ | $PQ^{St}$ |
|---|---|---|---|---|
| PCV | Res50 | 37.5 | 40.0 | 33.7 |
| RealTimePan | Res50-FPN | 37.1 | 41.0 | 31.3 |
| BGRNet | Res50-FPN | 43.2 | 49.8 | 33.4 |
| Unifying | Res50-FPN | 43.4 | 48.6 | 35.5 |
| Panoptic-Deeplab | Res50 | 35.1 | — | — |
| AdaptIS | Res50 | 35.9 | 40.3 | 29.3 |
| Axial-DeepLab-L | Axial-Res50-L | 43.9 | 48.6 | 36.8 |
| Auto-Panoptic | Auto | 44.8 | 51.4 | 35.0 |
| MS-PFPN | Res50-FPN | 40.6 | 46.6 | 31.6 |
| MS-PFPN & PRN | Res50* | 44.4 | 50.9 | 34.4 |
| DETR | Res50 | 43.4 | 48.2 | 36.3 |
| DETR & PRN | Res50* | 45.1 | 51.2 | 36.5 |

*indicates the backbone used for PRN.

Notably, the PQ of the refinement network (PRN) with MS-PanopticFPN as the base model is 9.3% better than that of Panoptic-Deeplab, even though PRN uses part of the instance mask representation (offset/center map) of Panoptic-Deeplab. PRN not only can refine the boundary of the instance mask and suppress incorrectly detected instances, but also discovers missing instance masks.

For all datasets, results on the validation set are reported. To evaluate the performance, particular embodiments adopt panoptic quality (PQ) as the metric, as illustrated in Table 1. PQ captures both recognition and segmentation quality, and treats both stuff and thing categories in a unified manner. Additionally, $PQ^{St}$ and $PQ^{Th}$ are used to report the performance on stuff and thing categories separately.

As illustrated in the next paragraph below in Table 2, experiments have been conducted on the Cityscapes dataset. Quantitative results are shown in Table 2. Particular embodiments train PRN on the panoptic segmentation results of Real-time Panoptic (Hou et al. 2020) and improve its PQ by 3.1%, surpassing the state-of-the-art result by 0.5%. As in the COCO dataset, PRN's PQ is 2.2% better than that of Panoptic-Deeplab (Cheng et al. 2020a), despite the similarities. Particular embodiments also apply SegFix (Yuan et al. 2020) on the same outputs of Real-time Panoptic and obtain lower overall PQ, lower PQ on things, and similar PQ on stuff. This is not surprising since SegFix cannot add or delete things, but is effective on the refinement of existing boundaries.

TABLE 2

Panoptic segmentation results on the Cityscapes validation set.

| Method | Backbone | PQ | $PQ^{Th}$ | $PQ^{St}$ |
|---|---|---|---|---|
| Panoptic FPN (Kirillov et al. 2019a) | Res50-FPN | 57.7 | 51.6 | 62.2 |
| UPSNet (Xiong et al. 2019) | Res50-FPN | 59.3 | 54.6 | 62.7 |
| AUNet (Li et al. 2019) | Res50-FPN | 56.4 | 52.7 | 59.0 |
| OCFusion (Lazarow et al. 2020) | Res50 | 59.3 | 53.5 | 63.6 |
| PCV (Wang et al. 2020a) | Res50 | 54.2 | 47.8 | 58.9 |
| Unifying (Li, Qi, and Torr 2020) | Res50-FPN | 61.4 | 54.7 | 66.3 |
| Panoptic-Deeplab (Cheng et al. 2020a) | Res50 | 59.7 | — | — |
| AdaptIS (Sofiiuk, Barinova, and Konushin 2019) | Res50 | 59.0 | 55.8 | 61.3 |
| Seamless (Porzi et al. 2019) | Res50-FPN | 60.2 | 55.6 | 63.6 |
| SSAP (Gao et al. 2019) | Res50-FPN | 61.4 | 54.7 | 66.3 |

TABLE 2-continued

Panoptic segmentation results on the Cityscapes validation set.

| Method | Backbone | PQ | $PQ^{Th}$ | $PQ^{St}$ |
|---|---|---|---|---|
| RealTimePan (Hou et al. 2020) | Res50-FPN | 58.8 | 52.1 | 63.7 |
| RealTimePan (Hou et al. 2020) & SegFix | HRNet-W48* | 60.5 | 54.0 | 64.6 |
| RealTimePan (Hou et al. 2020) & PRN | Res50* | 61.9 | 55.8 | 64.3 |

*indicates the backbone used for PRN. PRN refines the results of the Real-time Panoptic network and surpasses all published methods.

Exemplary Flow Diagrams

Figure 7:
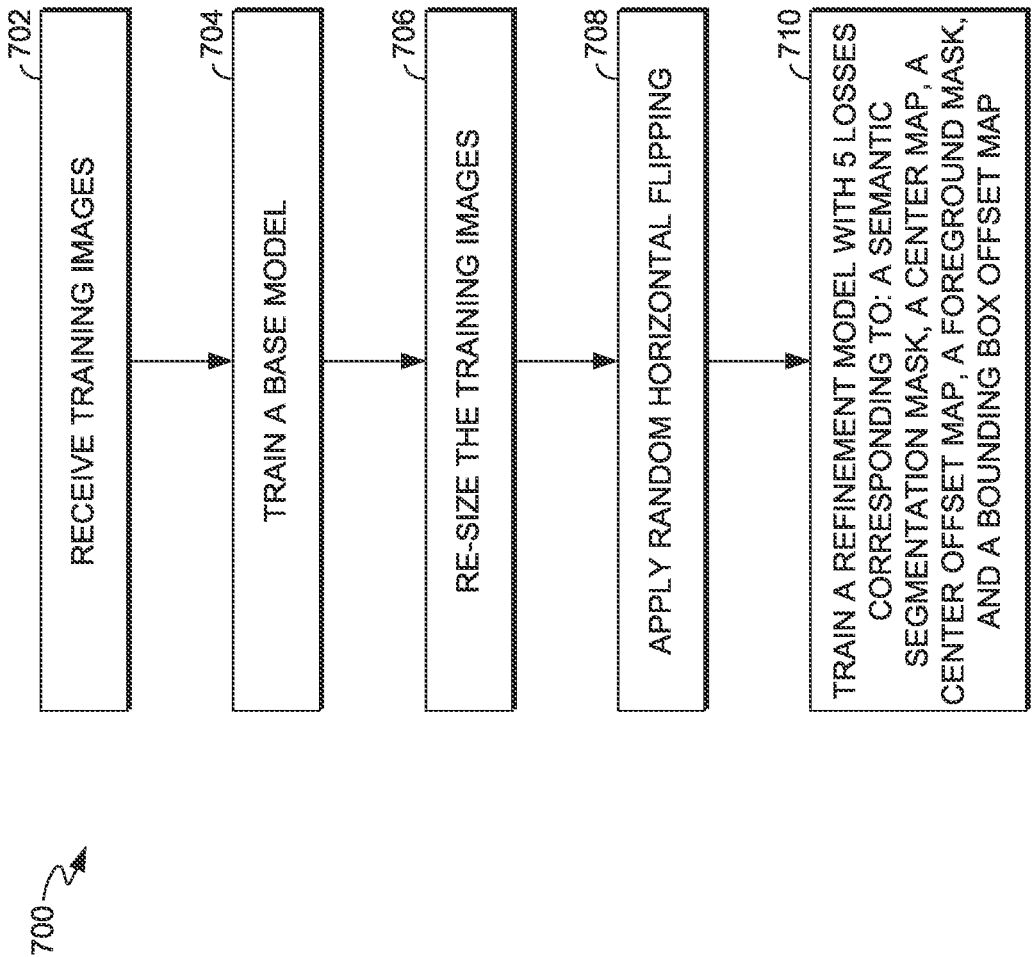
FIG. 7 is a flow diagram of an example process for training a refinement model, according to some embodiments.

FIG. 7 is a flow diagram of an example process 700 for training a refinement model, according to some embodiments. The process 700 (and/or any of the functionality described herein (e.g., process 800)) may be performed by processing logic that comprises hardware (e.g., circuitry, dedicated logic, programmable logic, microcode, and the like), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer storage media as described herein may perform or be caused to perform the processes 700 and/or any other functionality described herein.

Per block 702, training images are received. In some embodiments, the training images represent or include COCO and/or CITYSCAPE datasets. The COCO dataset is a widely used benchmark, which is developed for instance segmentation and stuff annotations. Some embodiments use all 2017 COCO images with 80 thing and 53 stuff classes annotated. CITYSCAPTES is a street-scene dataset containing high-resolution images (1,024×2,048) with fine pixel-accurate annotations for 8 thing and 11 stuff classes. In some embodiments, these images are used for training, validation, and testing, respectively. In an illustrative example, images can be labeled or annotated with various "things" classes (e.g., a dog, cat, car, etc.) and/or "stuff" classes (e.g., forest, sky, pavement, dirt, carpet, etc.). In this way, different features can be learned for given object classes and instances, as described in more detail below.

Per block 704, a base model (e.g., the base panoptic segmentation network 104) is trained. In some embodiments, the base model is pre-trained on 105 object categories and train semantic segmentation on 80 stuff categories from COCO stuff. In other words, for example, some embodiments train a base model in order to learn instance segmentation masks and semantic segmentation masks. Some embodiments resize the training images to keep their shorter side at 640 pixels and their longer side at or below 1,066 pixels. Some embodiments apply random horizontal flipping and GridMask data augmentation to the training images. In some embodiments, the base model is trained for 150K iterations with a batch size of 16 using the Stochastic Gradient Descent (SGD) algorithm with 0.9 momentum and 0.00001 weight decay. Some embodiments set the initial learning rate to 0.01 and use the cosine annealing learning rate scheduler.

Per block 706, some embodiments re-size the training images. For both COCO and CITYSCAPE datasets, for example, particular embodiments resize the training images to keep their shorter side at 640 and their longer side at or below 800 pixels. Per block 708, some embodiments apply random horizontal flipping and GridMask data augmentation. Random horizontal flipping is a type of image data augmentation, which horizontally flips a given image with a given probability. GridMask data augmentation randomly removes pixels, the removal regions of which are not continuous. Rather, the removed pixels are removed from a region with disconnected pixel sets.

State-of-the-art AI models typically require around 500 images per category during their training phase. If the available training dataset has fewer images, then a data augmentation technique can be used. This technique expands the small training dataset by adding additional images which are variations of available images in the dataset. Training a model with a large dataset (containing available+transformed images) will improve the performance and ability of the AI model to generalize.

Per block 710, a refinement model (e.g., the panoptic segmentation refinement network 110) is trained with five losses corresponding to a semantic segmentation mask, a center map, a center offset map, a foreground mask, and a bounding box offset map. In some embodiments, the refinement model is trained using Adam optimizer with 0.9 momentum and 0.0001 weight decay. Particular embodiments set the initial learning rate as 0.001 and use cosine annealing learning rate scheduler. In some embodiments, for COCO dataset, the refinement model is trained for 150K iterations with a batch size of 16. In some embodiments, for CITYSCAPES dataset, the refinement model is trained for 60K iterations with a batch size of 32. PRN is trained with these five losses, as follows:

$$\mathcal{L}_{PRN} = \lambda_0 \mathcal{L}_{sem} + \lambda_1 \mathcal{L}_{center\_heatmap} + \lambda_2 \mathcal{L}_{center\_offset} + \lambda_3 \mathcal{L}_{box\_offset} + \lambda_4 \mathcal{L}_{foreground}$$

Some embodiments set $\lambda_0=1$, $\lambda_1=200$, $\lambda_2=0.02$, $\times_3=0.02$, $\times_4=5$.

In some embodiments, learning or training at block 710 can include minimizing a loss function between the target variables (e.g., each of the ground truth five masks/maps predictions) and the actual variable (e.g., predicted masks/maps), such as to have no (or minimal) mismatch between target and actual predicted masks/maps. Based on the loss determined by a loss function (e.g., Mean Squared Error Loss (MSEL), cross-entropy loss, etc.), the loss function learns to reduce the error in prediction over multiple epochs or training sessions so that the model learns which features and weights are indicative of generating or predicting a given mask or map. Accordingly, it may be desirable to arrive as close to 100% confidence in a particular classification and/or output value as possible so as to reduce the prediction error. In an illustrative example and referring back to FIG. 5, a ground truth semantic mask can represent 509, but after a first epoch, the model can predict the semantic mask 530 and then learn over several epochs to arrive at a mask closer to 509, which is more accurate. Accordingly, training can include removing and/or adding pixel values (and/or bounding box locations) to arrive at the correct mask or map.

Training can include predicting the location and presence of one or more objects depending on the mask or map used. For example, learning a foreground mask can include learning that certain objects (e.g., cars, balls, animals) will always be represented in the foreground of an image and other certain objects (e.g., sun, sky, forest, etc.) will always be represented in the background. In another example, learning a center offset map or center may can include learning that for a given instance (e.g., a person), the center pixel will likely be at a particular coordinate. In another example, learning a bounding box offset map can include learning the bounding box coordinates of specific instances, as well as the distance offsets from the sides of the bounding box. In another example, learning a semantic segmentation mass may include learning which pixels define a particular object class.

In some embodiments, the refinement model learns, via training, parameters or weights so that similar features are closer (e.g., via Euclidian or Cosine distance) to each other in feature space by minimizing a loss via a loss function (e.g. Triplet loss or GE2E loss). Such training occurs based on one or more of the training data images, which are fed to the refinement model. Some embodiments can determine one or more feature vectors representing the inputs in vector space by aggregating (e.g. mean/median or dot product) the feature vector values to arrive at a particular point in feature space. For example, certain embodiments can formulate a dot product of different objects located in a mask, such as a background and several foreground objects.

In some embodiments, the model learns features from the training data and responsively applies weights to them during training. A "weight" in the context of machine learning may represent the importance or significance of a feature or feature value for prediction. For example, each feature may be associated with an integer or other real number where the higher the real number, the more significant the feature is for its prediction. In one or more embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights may proportionately reduce the value of the output. For instance, the more the value of the input increases, the more the value of the output decreases. Negative weights may contribute to negative scores.

In another illustrative example of the training, one or more embodiments learn an embedding of feature vectors based on learning (e.g., deep learning) to detect similar features between training data input(s) (labeled images) and/or the predicted target parameter values in feature space using distance measures, such as cosine (or Euclidian) distance. For example, the training data input is converted from digital image form into a vector (e.g., a set of real numbers) where each value or set of values represents the individual features (e.g., certain objects or instances) in feature space. Feature space (or vector space) may include a collection of feature vectors that are each oriented or embedded in space based on an aggregate similarity of features of the feature vector. Over various training stages or epochs, certain feature characteristics for each target prediction can be learned or weighted. For example, for a first instance class (e.g., a cat) of a foreground mask, a neural network can learn the particular pixel pattern (e.g., corresponding to pointy ears). Consequently, this pattern can be weighted (e.g., a node connection is strengthened to a value close to 1, whereas other node connections representing the second set of symptoms are weakened to a value closer to 0). In this way, embodiments learn weights corresponding to different features such that similar features found in inputs contribute positively for predictions.

In one or more embodiments, subsequent to the training at block 710, the machine learning model(s) (e.g., in a deployed state) receives one or more of the runtime inputs to make inferences. Responsively, in one or more embodiments, the input(s) are automatically converted to one or more feature vectors and mapped in the same feature space as vector(s) representing the training data input(s) and/or training predictions. Responsively, one or more embodiments determine a distance (e.g., a Euclidian distance) between the one or more feature vectors and other vectors representing the training data input(s) or predictions, which is used to generate a decision statistic or other value(s) (e.g., a predicted foreground mask). Accordingly, because the refined model has already learned to represent certain object classes and masks/maps, the input can be weighted (e.g., a node connection is strengthened to a value close to 1) to output the particular target value (e.g., fill in pixel values with a cat class identifier). In certain embodiments, the predicted target parameter values or any decision statistics may either be hard (e.g., membership of a class is a binary "yes" or "no") or soft (e.g., there is a probability or likelihood attached to the labels). Alternatively or additionally, transfer learning may occur. Transfer learning is the concept of re-utilizing a pre-trained model for a new related problem (e.g., a new video encoder, new feedback, etc.).

Figure 8:
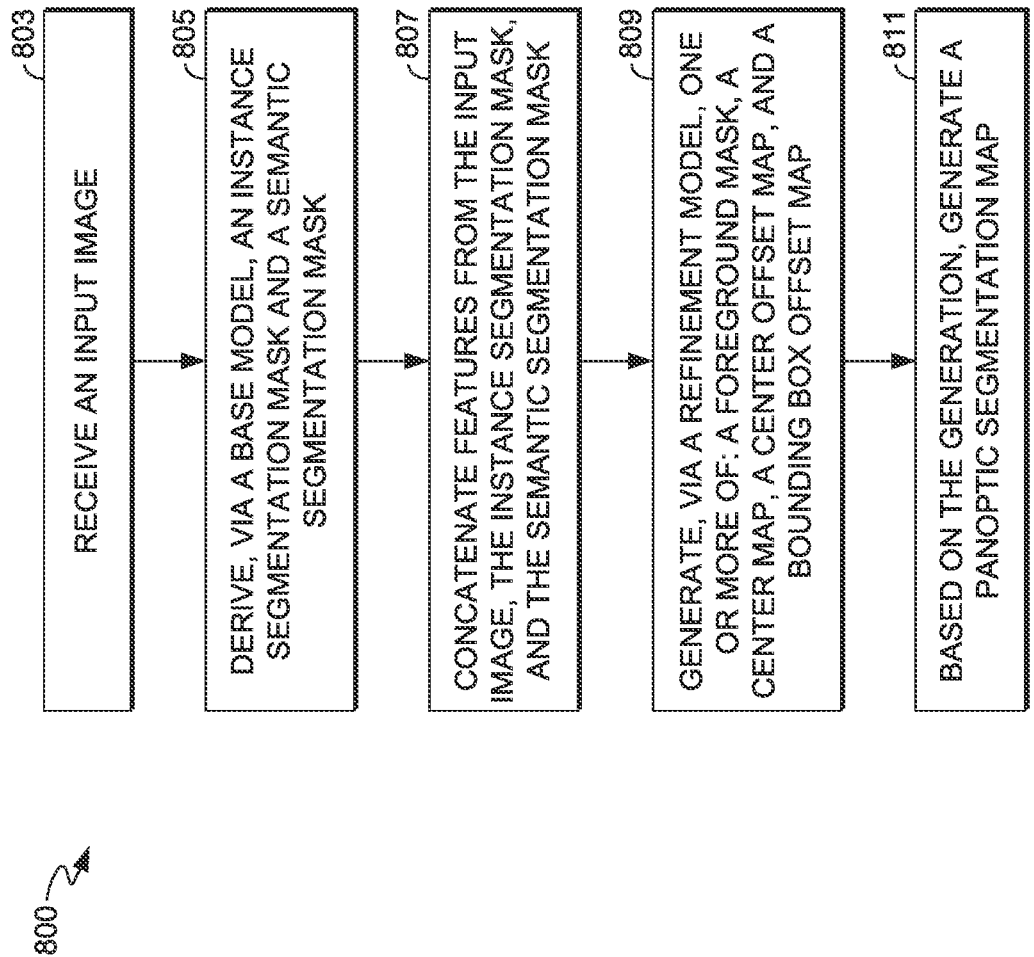
FIG. 8 is a flow diagram of an example process for generating a panoptic segmentation map, according to some embodiments.

FIG. 8 is a flow diagram of an example process 800 for generating a panoptic segmentation map, according to some embodiments. Per block 803, some embodiments receive an input image. For example, a model can receive the image 102 of FIG. 2 or the input image 502 of FIG. 5. The input image can be any suitable image that represents real-world objects, such as a RGB image that represents a real-world scenery with tree objects, a sky, and grass.

Per block 805, some embodiments derive, via a base model (e.g., the base panoptic segmentation network 104), an instance segmentation mask and a semantic segmentation mask. Examples of block 805 are described with respect to the base panoptic segmentation network 104 producing the instance segmentation mask 106 and the semantic segmentation mask 108. Other examples of this are described with respect to a base model producing the maps 303 and 305 of FIG. 3. To "derive" a mask means to either "generate" the mask itself or "receive" it from another model. In yet other examples, the input center offset map 503 and the input semantic mask 507 are generated.

In some embodiments, these masks derived at block 805 are referred to as first and second masks respectively. In some embodiments, the semantic segmentation mask indicates a set of objects in the input image belonging to a first object class. In some embodiments, an "object" refers to or represents some real-world thing. For example, referring back to the input semantic mask 507 and input image 502 of FIG. 5, the first person object 504 and second person object 508 of the input image 502 can be represented by the same pixel value in 530, indicating that the objects belong to the same object class—a person—even though there are two different people in the input image 502. In some embodiments, the instance segmentation mask defines each instance of the set of objects. An "instance" refers to a single occurrence or unit of an object, where there may be multiple instances of the same object class (e.g., multiple cats represented in a picture). For example, referring back to FIG. 5, even though the input semantic mask 507 defines the "person" objects together as the same value in 530, in the input center offset map 503, each person is defined uniquely—a first person object is represented by 510 and a second person object is represented by 512. To "define" an instance can mean to determine which pixels makeup an instance and represent them as a specific pixel value and/or generate an identifier that identifies the instance (e.g., "cat ID 1"). For example, each pixel representing an animal instance can be colored in red.

Per block 807, some embodiments concatenate or aggregates features from the input image, the instance segmentation mask, and the semantic segmentation mask. Examples of this are described with respect to the concatenation operation 307 to generate a feature map 311. For example, the pixel values and orientations from the input image 502, the input center offset map 503, and the input semantic mask 507 can be aggregated in a single feature vector.

Per block 809, some embodiments generate (e.g., based on the feature map), via a refinement model, one or more of: a foreground mask, a center map, a center offset map, and a bounding box offset map. Examples of this are described with respect to FIG. 3, where the encoder-decoder model 313 generates the output center map 317, the output center offset map & bounding box offset map 319, and the foreground mask 321. Other examples of this are generating the predicted center offset map 505 of FIG. 5, the bounding box offset map 400 of FIG. 4, and the generating of the foreground mask 602 of FIG. 6. In some embodiments, the refinement model is an encoder-decoder neural network that uses a single decoder to predict an identity and location of each instance of a set of objects. An example of such encoder-decoder neural network is described with respect to the encoder-decoder 313 of FIG. 3.

In some embodiments, the foreground mask indicates which pixels of the input image correspond to a foreground of the input image, where the foreground excludes pixels corresponding to a background of the input image. For example, the foreground mask can represent the foreground mask 602 of FIG. 6. In some embodiments, the generation of the foreground mask is based on the feature map as described, for example, with respect to the feature map 311 and the foreground mask 321 of FIG. 3. The generation of the foreground mask is also descried with respect to the foreground mask generator 212 of FIG. 2. In some embodiments, the foreground mask is a same resolution (e.g., high resolution) as the input image, as described herein.

Some embodiments generate, via the refinement model and using the instance segmentation mask, a center offset map and a center map, where the center map indicates a probability of a first pixel being a center pixel of a first instance of a set of objects, and where the center offset map indicates a location of the first pixel relative to the center pixel. Example of this is described with respect to the encoder-decoder taking the maps 303 to generate the maps 317 and 319. Other examples of this are described with respect to the predicted center offset map 505 of FIG. 5. The generation of the center map and center offset map is also described with respect to the center/center offset map generator 214 of FIG. 2.

Some embodiments generate a bounding box offset map over a first instance of the set of objects using the second mask and the third mask (e.g., the foreground mask and the instance segmentation mask). In some embodiments, the bounding box offset map indicates a distance that a first pixel, of the first instance, is from each side of a bounding box that encompasses the first instance. Examples of this are described with respect to the bounding box offset map 400 of FIG. 4. Other examples of the generation of the bounding box offset map are described with respect to the generation of the output bonding box offset map of 319 in FIG. 3. Other examples of this are described with respect to the bounding box offset map generator 216 of FIG. 2.

Per block 811, some embodiments generate a panoptic segmentation map based on the generation at block 809. In some embodiments, the panoptic segmentation map further refines or changes at least one of: the instance segmentation mask or the semantic segmentation mask as generated by a base model (e.g., the base panoptic segmentation network 104 of FIG. 1). Examples of block 811 are described by the generation of the panoptic segmentation map 112 of FIG. 1, the panoptic segmentation 327 of FIG. 3, and the generation of the segmentation map 606 of FIG. 6.

Some embodiments merge the offset map and the center map for the generation of the panoptic segmentation map at block 811. Examples of this are described with respect to the majority voting and final merging of the semantic segmentation map 323 and the instance segmentation 325 of FIG. 3.

In some embodiments, the panoptic segmentation map is used to produce an output image that indicates an identity of the one or more objects and an identity of one or more instances. Examples of such output image is described with respect to 606 of FIG. 6, which illustrates an identity of three types of objects: sky, cat, and pavement, as well as identity of various instances of the "cat" class—cat 612, cat 614, and cat 616 (i.e., cat 1, cat 2, and cat 3).

In some embodiments, the output image or panoptic segmentation map includes pixels that indicate a refinement of a boundary that defines a first instance of the instance segmentation mask based at least in part on the generation of the foreground mask. Refining a boundary can include providing for higher resolution or changing pixel locations and/or values relative to base model predictions. As described herein, particular embodiments predict the foreground mask at the same high resolution as the input image. This provides higher segmentation fidelity especially to the instance categories, as the boundaries of instances which are in contact with the stuff masks are primarily decided by the foreground mask. In an illustrative example of refining a boundary of an instance segmentation mask, a refinement model may generate, at higher resolution, each of the pixels that define the outer edges of the cat 612 of FIG. 6 relative to results from a base model.

In some embodiments, the output image or panoptic segmentation mask excludes a first instance of the set of objects based on the generating at block 809. In some embodiments, such exclusion is indicative that the first instance was incorrectly defined at the instance segmentation mask. Examples of this is described in FIG. 5, where the second person object 508 was incorrectly split into instances 512 and 514 of the input center offset map. However, a panoptic segmentation mask would exclude 512 and 514 by only including a single mask, as illustrated, for example, by the pixel values 524 (which represents the second person object 508 instead of splitting the object 508 into multiple objects).

In some embodiments, the output image or panoptic segmentation map includes a fourth mask that defines a second instance of the set of objects, where the second instance is not defined in the instance segmentation mask and where the second instance is generated based on the generation at block 809. For example, a base instance segmentation mask may group two birds or other objects together (e.g., both birds may be defined by the same pixel value) such that they are defined to be the same instance. However, the output image may split the two birds apart (e.g., by making both birds separate pixel values) such that they are defined to be different instances.

Exemplary Operating Environments

Figure 9:
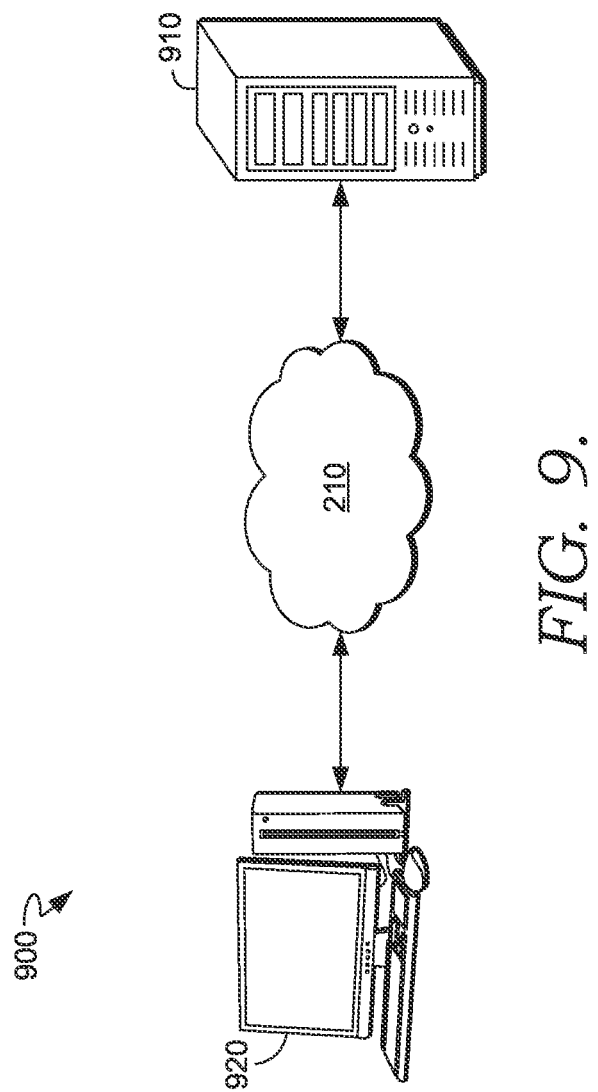

Turning now to FIG. 9, a schematic depiction is provided illustrating an example computing environment 900, in which some embodiments of the present technology may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. For example, there may be multiple servers 910 that represent nodes in a cloud computing network. Various functions described herein as being performed by one or more entities may be carried out by hardware, firmware, and/or software. For instance, various functions may be carried out by a processor executing instructions stored in memory.

The environment 000 depicted in FIG. 9 includes a prediction server ("server") 910 that is in communication with a network 210. The environment 900 further includes a client device ("client") 920 that is also in communication with the network 210. Among other things, the client 920 can communicate with the server 910 via the network 210, and generate for communication, to the server 910, a request to generate one or more visual renderings from an input image (image-to-material translation). In various embodiments, the client 920 is embodied in a computing device, which may be referred to herein as a client device or user device, such as described with respect to the computing device 1000 of FIG. 10.

In some embodiments, each component in FIG. 2 is included in the server 910 and/or the client device 920. Alternatively, in some embodiments, the components of FIG. 2 are distributed between the server 910 and client device 920.

The server 910 can receive the request communicated from the client 920, and can search for relevant data via any number of data repositories to which the server 910 can access, whether remotely or locally. A data repository can include one or more local computing devices or remote computing devices, each accessible to the server 910 directly or indirectly via network 210. In accordance with some embodiments described herein, a data repository can include any of one or more remote servers, any node (e.g., a computing device) in a distributed plurality of nodes, such as those typically maintaining a distributed ledger (e.g., block chain) network, or any remote server that is coupled to or in communication with any node in a distributed plurality of nodes. Any of the aforementioned data repositories can be associated with one of a plurality of data storage entities, which may or may not be associated with one another. As described herein, a data storage entity can include any entity (e.g., retailer, manufacturer, e-commerce platform, social media platform, web host) that stores data (e.g., names, demographic data, purchases, browsing history, location, addresses) associated with its customers, clients, sales, relationships, website visitors, or any other subject to which the entity is interested. It is contemplated that each data repository is generally associated with a different data storage entity, though some data storage entities may be associated with multiple data repositories and some data repositories may be associated with multiple data storage entities. In various embodiments, the server 910 is embodied in a computing device, such as described with respect to the computing device 1000 of FIG. 10.

Figure 10:
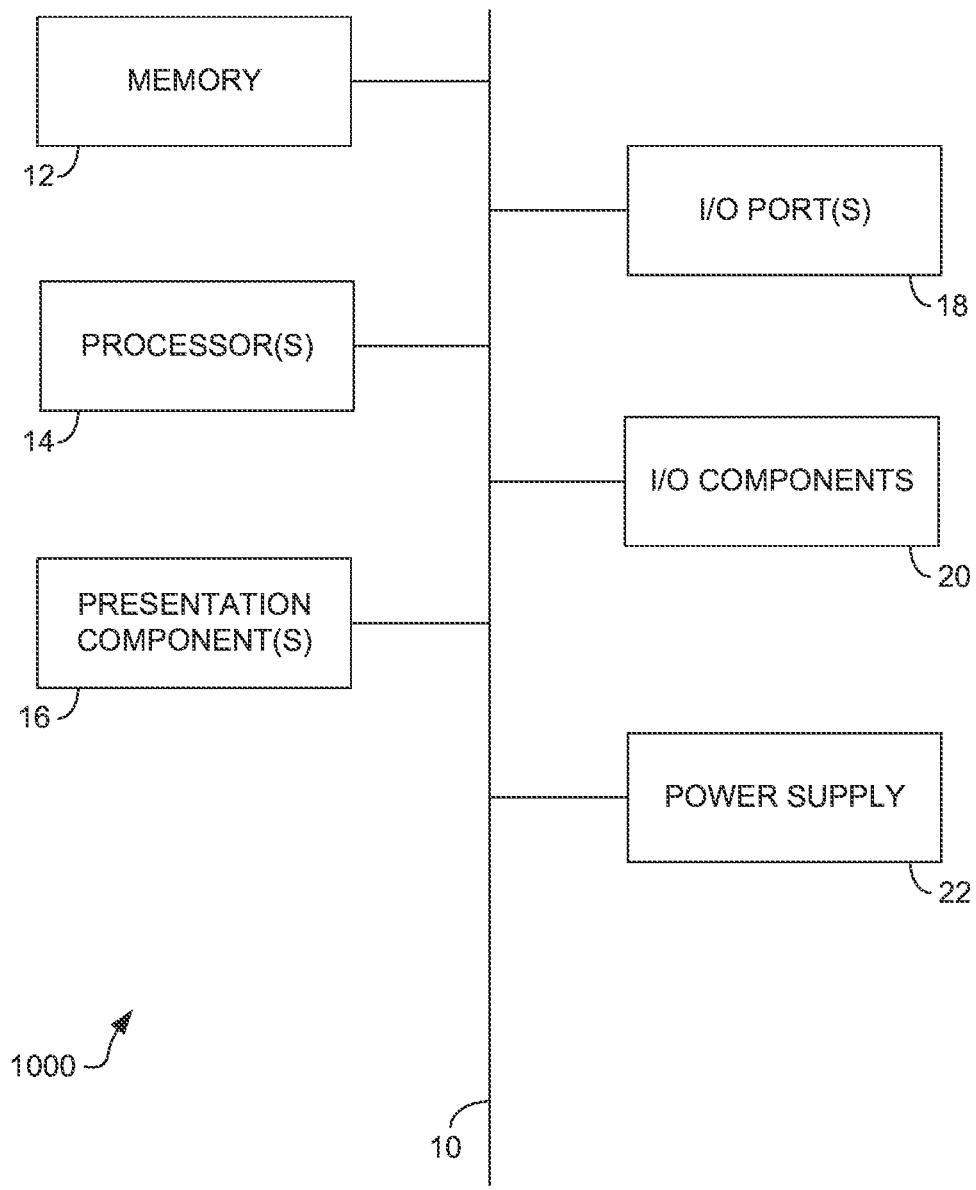
FIG. 10 is a block diagram of a computing device in which aspects of the present disclosure employ, according to some embodiments.

Having described embodiments of the present technology, an exemplary operating environment in which embodiments of the present technology may be implemented is described below in order to provide a general context for various aspects of the present technology. Referring initially to FIG. 10 in particular, an exemplary operating environment for implementing embodiments of the present technology is shown and designated generally as computing device 1000. Computing device 1000 is but one example of a suitable computing environment and is not intended to suggest any limitation as to the scope of use or functionality of the technology. Neither should the computing device 1000 be interpreted as having any dependency or requirement relating to any one or combination of components illustrated.

Looking now to FIG. 10, computing device 1000 includes a bus 10 that directly or indirectly couples the following devices: memory 12, one or more processors 14, one or more presentation components 16, input/output (I/O) ports 18, input/output components 20, and an illustrative power supply 22. Bus 10 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 10 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1300 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In various embodiments, the computing device 1000 represents the client device 920 and/or the server 910 of FIG. 9.

Memory 12 includes computer-storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 12 or I/O components 20. Presentation component(s) 16 present data indications to a user or other device. Exemplary presentation components include a display device, speaker, printing component, vibrating component, etc. In some embodiments, the memory includes program instructions that, when executed by one or more processors, cause the one or more processors to perform any functionality described herein, such as the process 700 or 800 or any functionality described with respect to FIGS. 1 through 10.

I/O ports 18 allow computing device 1000 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be equipped with depth cameras, such as stereoscopic camera systems, infrared camera systems, RGB camera systems, touchscreen technology, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

As can be understood, embodiments of the present technology provide for, among other things, generating proof and attestation service notifications corresponding to a determined veracity of a claim. The present technology has been described in relation to particular embodiments, which are intended in all respects to be illustrative rather than restrictive. Alternative embodiments will become apparent to those of ordinary skill in the art to which the present technology pertains without departing from its scope.

From the foregoing, it will be seen that this technology is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter of the present technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computerized system, the system comprising:
one or more processors; and
computer storage memory having computer-executable instructions stored thereon which, when executed by the one or more processors, implement a method comprising:
receiving an input image;
deriving, via at least a first model, a first mask and a second mask, the first mask indicates a set of objects in the input image belonging to a first object class, the second mask defines each instance of the set of objects;
generating a feature map by concatenating one or more features from at least: the input image, the first mask, and the second mask;
based on the feature map, generating, via at least a second model, a third mask, the third mask indicates which pixels of the input image correspond to a foreground of the input image, the foreground excludes pixels corresponding to a background of the input image; and
based on the generating of the third mask, causing presentation of an output image associated with the input image, wherein the output image includes a fourth mask that defines a second instance of the set of objects, the second instance not being defined in the second mask.

2. The system of claim 1, wherein the method further comprises:
using the second mask, generating, via the second model, a center offset map and a center map, the center map indicates a probability of a first pixel being a center pixel of a first instance of the set of objects, the center offset map indicates a location of the first pixel relative to the center pixel; and
based on the third mask, merging the center offset map and the center map, wherein the causing presentation of the output image is based on the merging.

3. The system of claim 1, wherein the method further comprises:
using the second mask and the third mask, generating a bounding box offset map over a first instance of the set of objects, the bounding box offset map indicates a distance that a first pixel, of the first instance, is from each side of a bounding box that encompasses the first instance, wherein the causing presentation of the output image is based on the generating of the bounding box offset map.

4. The system of claim 1, wherein the third mask is a same resolution as the input image.

5. The system of claim 1, wherein the second model is an encoder-decoder neural network that uses a single decoder to predict an identity and location of each instance of the set of objects.

6. The system of claim 1, wherein the output image includes pixels that indicate a refinement of a boundary that defines a first instance of the second mask based on the generating of the third mask.

7. The system of claim 1, wherein the output image excludes a first instance of the set of objects based on the generating of the third mask, wherein the excluding is indicative that the first instance was incorrectly defined at the second mask.

8. The system of claim 1, wherein the output image represents or is associated with a panoptic segmentation map that refines the first mask and the second mask.

9. A computer-implemented method comprising:
receiving an input image;
deriving a first mask and a second mask, the first mask indicates one or more objects located in the input image, the second mask indicates a first instance of the one or more objects;
based on the second mask, generating, via a model, at least one of a center offset map or a center map, the center map indicates a probability of each pixel representing the first instance being a center pixel of the first instance, the center offset map indicates a location of each pixel relative to the center pixel; and
based on the generating of at least one of the center offset map or the center map, generating a panoptic segmentation map, the panoptic segmentation map further refines at least one of: the first mask or the second mask.

10. The method of claim 9, wherein the generating of the center offset map and the center map is based on generating a third mask, the third mask indicates which pixels of the input image correspond to a foreground of the input image, the foreground excluding pixels representing a background of the input image.

11. The method of claim 10, further comprising:
using the second mask and the third mask, generating a bounding box offset map over the first instance, the bounding box offset map indicates a distance that a first pixel, of the first instance, is from each side of a bounding box that encompasses the first instance, wherein the generation of the panoptic segmentation map is based on the generating of the bounding box offset map.

12. The method of claim 10, wherein the third mask is a same resolution as the input image.

13. The method of claim 9, wherein the model is an encoder-decoder neural network that uses a single decoder to predict an identity and location of the first instance and predict an identity and location of the one or more objects.

14. The method of claim 9, wherein the panoptic segmentation map includes pixels that indicate a refinement of a boundary that defines the first instance of the second mask.

15. The method of claim 9, wherein the panoptic segmentation map excludes the first instance, wherein the excluding is indicative that the first instance was incorrectly defined at the second mask.

16. The method of claim 9, wherein the panoptic segmentation map includes a fourth mask that indicates a second instance, the fourth mask not being defined in the input image.

17. The method of claim 9, wherein the panoptic segmentation map is used to produce an output image that indicates an identity of the one or more objects and an identity of the first instance.

18. A computerized system, the system comprising:
- a base mask extracting means for deriving a first mask and a second mask, the first mask indicates one or more objects located in an input image, the second mask indicates a first instance of the one or more objects;
- a bounding box offset map means for generating a bounding box offset map over the first instance based on the second mask, the bounding box offset map indicates a distance that a first pixel, of the first instance, is from each side of a bounding box that encompasses the first instance; and
- a panoptic segmentation map means for generating a panoptic segmentation map based on the generating of the bounding box offset map, the panoptic segmentation map changes at least one of: the first mask or the second mask.

19. The system of claim 18, wherein the generating of the panoptic segmentation map is further based on generating a third mask that indicates which pixels of the input image correspond to a foreground of the input image and further based on generating a center offset map and a center map, the center map indicates a probability of each pixel representing the first instance being a center pixel of the first instance, the center offset map indicates a location of each pixel relative to the center pixel.

* * * * *